(12) United States Patent
Matsumura et al.

(10) Patent No.: US 6,222,583 B1
(45) Date of Patent: Apr. 24, 2001

(54) DEVICE AND SYSTEM FOR LABELING SIGHT IMAGES

(75) Inventors: Takahiro Matsumura; Toshiaki Sugimura; Masaji Katagiri; Hirotaka Nakano; Akira Suzuki; Takeshi Ikeda, all of Tokyo (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 09/042,685

(22) Filed: Mar. 12, 1998

(30) Foreign Application Priority Data

| Mar. 27, 1997 | (JP) | 9-075471 |
| Jul. 11, 1997 | (JP) | 9-186679 |
| Aug. 7, 1997 | (JP) | 9-213251 |
| Oct. 14, 1997 | (JP) | 9-280727 |

(51) Int. Cl.$^7$ .................................................. H04N 7/00
(52) U.S. Cl. ..................... 348/113; 348/116; 382/255; 382/154; 345/433
(58) Field of Search ................................... 348/113, 116; 382/255, 154; 345/433

(56) References Cited

U.S. PATENT DOCUMENTS

| 5,155,774 | * | 10/1992 | Numagami | 348/116 |
| 5,467,441 | * | 11/1995 | Stone et al. | 345/433 |
| 5,963,664 | * | 10/1999 | Kumar et al. | 382/154 |
| 5,974,190 | * | 10/1999 | Maeda et al. | 382/255 |

FOREIGN PATENT DOCUMENTS

| 0 406 946 A1 | 1/1991 | (EP) . |
| 0 539 144 A2 | 4/1993 | (EP) . |
| 58-201016 | 11/1983 | (JP) . |
| 7-115571 | 5/1995 | (JP) . |
| 9-14976 | 1/1997 | (JP) . |
| 9-33271 | 2/1997 | (JP) . |
| 9-33277 | 2/1997 | (JP) . |

\* cited by examiner

*Primary Examiner*—Chris Kelley
*Assistant Examiner*—Allen Wong
(74) *Attorney, Agent, or Firm*—Pennie & Edmonds LLP

(57) ABSTRACT

The device and system for sight labeling according to the present invention comprises an image acquiring section for taking images, a position information acquiring section for recording a camera position while the images are being taken, a camera descriptive information acquiring section for acquiring the camera angle, focal distance and image size while the image are being taken, a map information management section for managing map information, determining a view space inside map information space based on the acquired position, camera angle, focal distance and image size, and capturing constructions present inside the view space, a label information preparation section for preparing label information including the names or descriptive information of constructions and transfer positions, a labeling information output section for overlaying the names or descriptive information from the map information at positions in the images corresponding to position information in the prepared label information, and a control section for controlling each of the sections described above.

19 Claims, 20 Drawing Sheets

FIG.4

○ HEADER INFORMATION
  POSITION INFORMATION
  EAST LONG. NORTH LAT. ELEV.   137°55'10"  34°34'30"  101m33cm
  CAMERA ANGLE
  HORIZONTAL ANGLE  ELEV.ANGLE   254°  CLOCKWISE   15°
  FOCAL DISTANCE
    mm                            28mm
  IMAGE SIZE
    PIXELS × PIXELS               640 × 480
  TIME INFORMATION   JAPANESE TIME JAN. 31 1997 15:15.15
  IMAGE FILE SIZE
    FILE TYPE                     TIFF
    BYTES                         307.2kB
○ IMAGE DATA
  BINARY-TYPE DATA

FIG.11
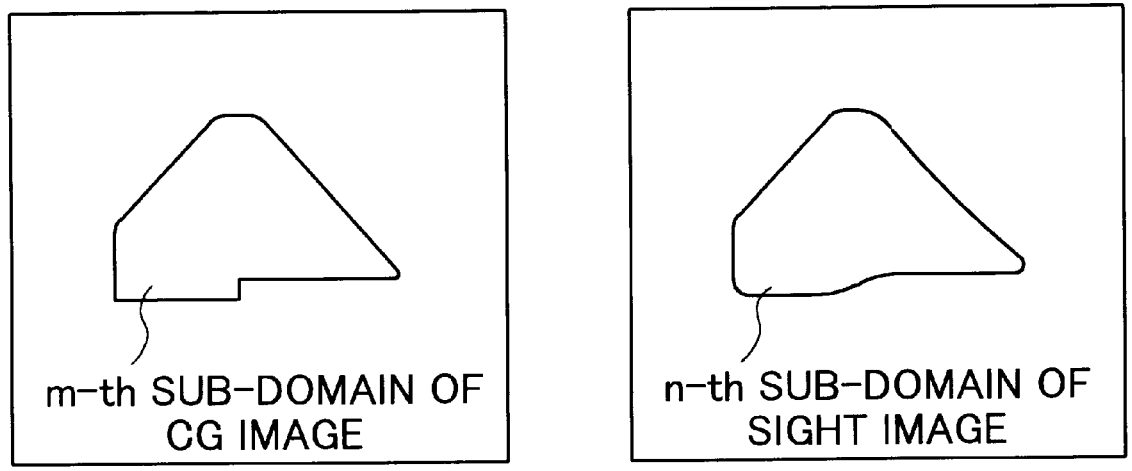
m-th SUB-DOMAIN OF CG IMAGE
n-th SUB-DOMAIN OF SIGHT IMAGE
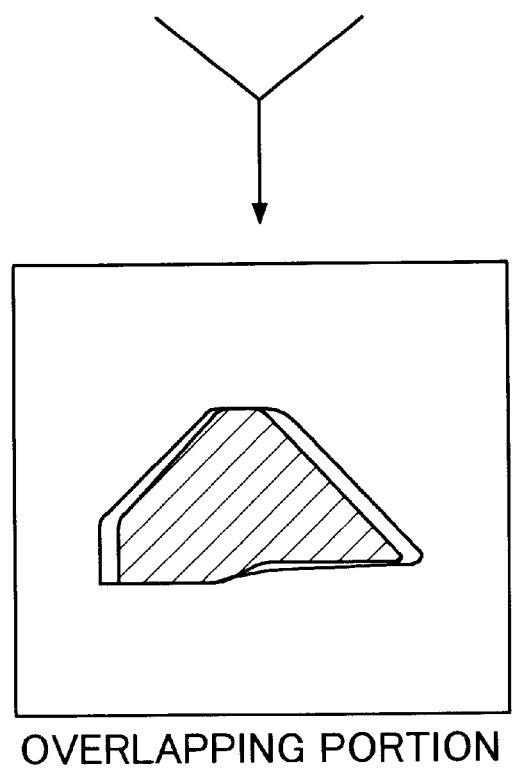
OVERLAPPING PORTION m-th SUB-DOMAIN OF
CG IMAGE

SIGHT IMAGE

DEVICE AND SYSTEM FOR LABELING SIGHT IMAGES

BACKGROUND OF THE INVENTION

1. Field of the Invention

The present invention relates to a device and system for providing information to a user regarding an image filmed by using a sight image input device such as a camera on a moving body or the like, by overlaying geographical information regarding each sub-domain of the image on an image display device or a transmissive screen.

The present application is based on Patent Applications Nos. Hei 9-75471, Hei 9-186679, Hei 9-213251 and Hei 9-280727 filed in Japan, the contents of which are incorporated herein by reference.

2. Conventional Art

As conventional systems for notifying users of geographical information relating to the user's surroundings, there are various types of navigation systems. For example, Japanese Patent Application, First Publication No. Hei 8-273000 discloses a navigation device comprising a position renewal section for renewing the position of a vehicle by referring to road map data when position data and movement data of the vehicle are input, a display data generating section for generating display road data and display background data based on map data and the like, a three-dimensional video image data generating section for preparing three-dimensional video image data based on these display data, and a memory section. When a user presets a travel route including a destination area and transit areas, this navigation device offers the capability of setting routes while regarding a video image display screen prepared by a computer which reproduces actually existing roads and the surroundings thereof, instead of a two-dimensional map screen. Additionally, according to this device, a user is able to see a moving image display which follows the route over which the user is actually traveling.

However, when performing route guidance using the same device, the user must ultimately compare the actual scenery with the geographical information from the computer, in order to identify what the objects in the actual scenery are. In other words, in order to identify what a building, road or mountain actually in the user's perspective is, the user must subconsciously work the brain in order to perform correspondence work between what the user sees and the symbols in the map which is displayed as a moving image. In cities, the user compares the map prepared by the computer with the actual scenery in order to grasp the user's orientation or to find landmarks, and after recognizing the features of buildings in the direction of progression, reconsiders the map to identify the building. For this reason, the work of comparing the map in the computer with the actual scenery several times to correlate objects on the part of the user cannot be eliminated. Particularly in darkness or at night, the actual scenery is difficult to see, and it is difficult to make a correlation.

SUMMARY OF THE INVENTION

The present invention has the object of offering a device and system for labeling sight images for informing users by correlating geographical information in a computer with parts of an image displayed on a monitor filing the actual scenery or a video image (hereinafter referred to as a sight image) displayed on an object such as a windshield capable of transmitting the actual scenery.

A first embodiment of the present invention is a device for sight labeling comprising an image acquiring section for taking images; a position information acquiring section for acquiring a camera position while the images are being taken; a camera descriptive information acquiring section for acquiring a camera angle, a focal distance and an image size while the images are being taken; a map information management section for managing map information, determining a view space inside a map information space based on the acquired position, camera angle, focal distance and image size, and capturing constructions present inside the view space; a label information preparation section for preparing label information including names or descriptive information of the constructions and their transfer positions; a labeling information output section for overlaying the names or descriptive information from the map information at positions in the images corresponding to position information in the prepared label information, and outputting the overlayed images to a visual device; and a control section for controlling the sections described above.

Another embodiment of the present invention is a system for sight labeling comprising a sight labeling terminal and a sight labeling center; the sight labeling terminal comprising an image acquiring section for taking images, a position information acquiring section for acquiring a camera position while the images are being taken, a camera descriptive information acquiring section for acquiring a camera angle, a focal distance and an image size while the images are being taken, an image processing section for dividing the taken images into a plurality of sub-domains, a communication control section for sending information relating to division of the images into sub-domains, the camera angle, the focal distance and the image size through the communication network to the sight labeling center, and receiving label information from the sight labeling center, a label information output section for overlaying names or descriptive information of constructions inside the label information at corresponding positions in the images, and outputting the overlayed images to a visual device, and a terminal control section for controlling the sections described above; and the sight labeling center comprising a communication control section for receiving information relating to division of the images into sub-domains, the camera angle, the focal distance and the image size through the communication network from the sight labeling terminal, and sending the label information to the sight labeling terminal, a map information management section for managing map information, determining a view space inside map information space based on the received position, camera angle, focal distance and image size, and capturing constructions present inside the view space, a label information preparation section for correlating the captured constructions with respect to the sub-domains of the images, and preparing label information including the names or descriptive information of the correlated constructions and their transfer positions, and a center control section for controlling the sections described above.

Another embodiment of the present invention is a device for sight labeling comprising an image acquiring section for taking images; a position information acquiring section for acquiring a camera position while the images are being taken; a camera descriptive information acquiring section for acquiring a camera angle, a focal distance and an image size while the images are being taken; an image processing section for dividing images acquired by the image acquiring section into a plurality of sub-domains; map information management section for managing map information, determining a view space inside a map information space based on the acquired position, camera angle, focal distance and image size, and capturing constructions present inside the view space; a label information preparation section for correlating the captured constructions with respect to sub-domains of the images, and preparing label information including the names or descriptive information of the correlated constructions and their transfer positions; a communication address memory section for storing communication addresses of communication devices relating to the constructions; a communication processing section for setting up communication paths with the communication addresses based on the received communication addresses; a label information output section for overlaying the names or descriptive information from the map information at positions in the images corresponding to the transfer positions in the prepared label information, and outputting the overlayed images to a visual device; a screen position indicating section for allowing a user to indicate a position on the screen of the visual device, determining the construction in the label information corresponding to the indicated screen position when a position on the screen of the visual device is indicated by the user, determining the communication address of the communication device relating to the determined construction from the communication address memory section; and a control section for controlling the sections described above.

Another embodiment of the present invention is a system for sight labeling comprising a sight labeling terminal and a sight labeling center; the sight labeling terminal comprising an image acquiring section for taking images, a position information acquiring section for acquiring a camera position while the images are being taken, a camera descriptive information acquiring section for acquiring a camera angle, a focal distance and an image size while the images are being taken, an image processing section for dividing the taken images into a plurality of sub-domains, a communication control section for sending information relating to division of the images into sub-domains, the camera angle, the focal distance and the image size through the communication network to the sight labeling center, and receiving label information and communication addresses from the sight labeling center, a communication processing section for setting up paths to the communication addresses based on the received communication addresses, a label information output section for overlaying names or descriptive information of constructions inside the label information at corresponding positions in the images, and displaying the overlayed images on a visual device, a screen position indicating section for allowing a user to indicate a position on the screen of the visual device, determining the construction in the label information corresponding to the indicated screen position when a position on the screen of the visual device is indicated by the user, outputting the construction to the communication control section, and sending the communication address of the communication device relating to the construction received by the communication control section to the communication processing section; and a terminal control section for controlling the sections described above; and the sight labeling center comprising a communication control section for receiving information relating to division of the images into sub-domains, the camera angle, the focal distance and the image size through the communication network from the sight labeling terminal, and sending the label information and communication address to the sight labeling terminal, a map information management section for managing map information, determining a view space inside map information space based on the received position, camera angle, focal distance and image size, and capturing constructions present inside the view space, a label information preparation section for correlating the captured constructions with respect to the sub-domains of the images, and preparing label information including the names or descriptive information of the correlated constructions and their transfer positions, a communication address memory section for storing communication addresses of communication devices relating to the constructions, and outputting communication addresses of constructions indicated by information of constructions in the label information, and a center control section for controlling the sections described above.

Another embodiment of the present invention is a system for sight labeling comprising a sight labeling terminal and a sight labeling center; the sight labeling terminal comprising an image acquiring section for taking images, a position information acquiring section for acquiring a camera position while the images are being taken, a camera descriptive information acquiring section for acquiring a camera angle, a focal distance and an image size while the images are being taken, an image processing section for dividing the taken images into a plurality of sub-domains, a communication control section for sending information relating to division of the images into sub-domains, the camera angle, the focal distance and the image size through the communication network to the sight labeling center, and receiving label information and communication addresses from the sight labeling center, a label information output section for overlaying names or descriptive information of constructions inside the label information at corresponding positions in the images, and displaying the overlayed images on a visual device, and for displaying a communication address on the visual device when the communication address is received, a screen position indicating section for allowing a user to indicate a position on the screen of the visual device, determining the construction in the label information corresponding to the indicated screen position when a position on the screen of the visual device is indicated by the user, outputting the construction to the communication control section, and sending the communication address of the communication device relating to the construction received by the communication control section to the label information output section; and a terminal control section for controlling the sections described above; and the sight labeling center comprising a communication control section for receiving information relating to division of the images into sub-domains, the camera angle, the focal distance and the image size through the communication network from the sight labeling terminal, and sending the label information and communication address to the sight labeling terminal, a map information management section for managing map information, determining a view space inside map information space based on the received position, camera angle, focal distance and image size, and capturing constructions present inside the view space, a label information preparation section for correlating the captured constructions with respect to the sub-domains of the images, and preparing label information including the names or descriptive information of the correlated constructions and their transfer positions, a communication memory section for storing communication addresses of communication devices relating to the constructions, and outputting communication addresses of constructions indicated by information of constructions in the label information, and a center control section for controlling the sections described above.

Since the present invention correlates map information in a computer with each part of a sight image which is actual scenery and displays the results to a user, humans are not required to make correlations by comparing a map on a computer with the actual scenery.

Additionally, since another embodiment of the present invention correlates map information in a computer with each part of a sight image of the actual scenery and displays the results to a user, humans are not required to make correlations by comparing a map on a computer with the actual scenery, and since it is also possible, simply by touching an area of the screen, to be notified of the telephone numbers or the like of residents of the building occupying that area or to automatically make telephone calls or the like thereto, it can be used by users as an extremely convenient new type of telephone directory.

BRIEF DESCRIPTION OF THE DRAWINGS

FIG. 4 is a diagram showing the data structure of a sight image file.

FIG. 11 is a diagram for explaining pattern matching of sub-domains of a sight image with the sub-domains of a CG image.

DESCRIPTION OF PREFERRED EMBODIMENTS

Figure 1:
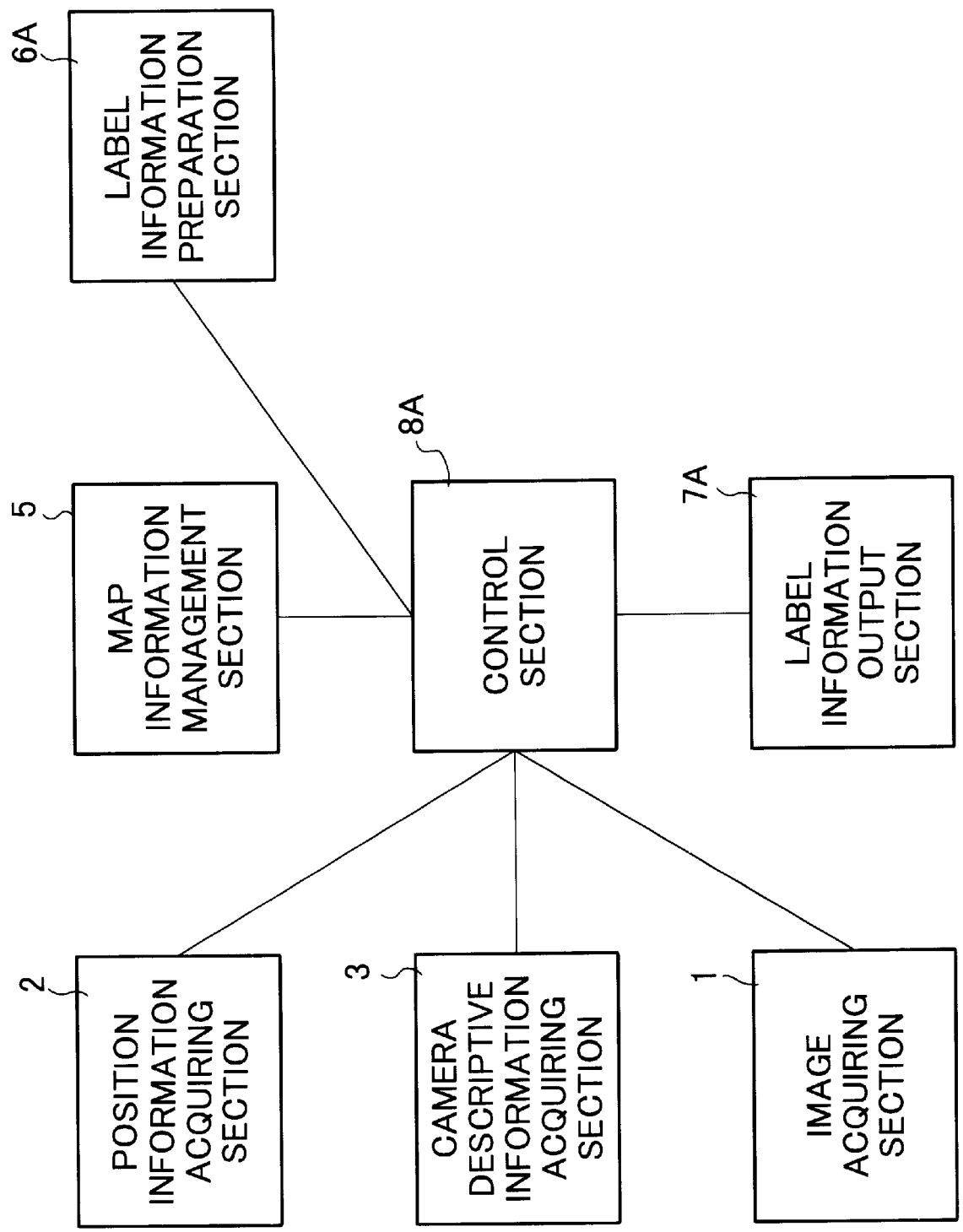
FIG. 1 is a diagram showing the structure of a sight labeling device according to a first embodiment of the present invention.

First, an example of the basic structure of a device for labeling sight images achieved by the present invention (hereinafter referred to as a sight labeling device) shall be explained. The sight labeling device of the present invention prepares map data in a computer in the form of three-dimensional data, obtains the camera position, camera angle, focal distance and image size of a filmed image (hereinafter referred to as a "sight image" in order to discriminate it from a computer graphics (hereinafter, CG) image) during filming, determines a view space (visual space) for a case of viewing from the camera position and angle and focal distance in the three-dimensional map space in the computer, obtains geographical information regarding constructions contained in the determined view space, then overlays and displays the geographical information on the sight image which is the actual scenery, thereby allowing for correlation therebetween. The sight image forming the background for overlaying and displaying the geographical information is not necessarily restricted to being images of a filmed sight image displayed on a monitor, and may for example be images of actual scenery transmitted through glass such as a windshield or reflected by a mirror or the like. This geographical information includes the names and/or descriptive information relating to constructions and the like prepared in the computer, descriptive information meaning information regarding the various characteristics (such as profile and color) of constructions. The term "constructions" as referred to in the present specification is used not only to refer to manmade constructions, but also to all data having any kind of geographical structure in the map database, including mountains, rivers and oceans. When geographical information is overlayed and displayed on a sight image, the position in the sight image (hereinafter referred to as the "transfer position") at which each construction indicated by the geographical information should appear is determined based on the camera position, camera angle, focal distance and image size, in order to overlay and display the name or descriptive information of the construction.

Furthermore, for the purposes of further increasing the level of precision of correlation between constructions in the sight image and constructions in the CG image, the constructions first captured in each sub-domain of the sight image are correlated by pattern matching. The CG image is prepared based on the captured constructions, the sub-domains of the CG image are correlated to sub-domains in the sight image by pattern matching, and the construction which is the basis of the correlated sub-domain is determined. Hereinbelow, an example of a method for preparing CG images shall be described. The three-dimensional map database (hereinafter referred to as "DB") is accessed on the basis of the previously obtained camera position, camera angle, focal distance and image size to determine the view space in the three-dimensional map space. The constructions in the view space are determined and the three-dimensional data for each construction is transformed into a three-dimensional projection onto a projection plane formed by the camera screen. Furthermore, of the line data forming the projection diagram of each construction, the line data which are not capable of being seen due to being occluded by other constructions are eliminated as occluded lines by using a method such as a normal vector method. The CG image is divided into sub-domains based on the line data which remains after elimination of occluded lines. Since a three-dimensional map data DB is being used, the name of the construction corresponding to each sub-domain is correlated to that sub-domain.

Then, the name of the construction in each sub-domain of the CG image correlated to each sub-domain of the sight image by means of pattern matching is extracted. The positional coordinates of the actual scenery image onto which the extracted construction name is to be overlayed are determined by three-dimensional projective transformation of the positional coordinates of the construction in the three-dimensional map space onto the projection plane. Label information is prepared from the positional coordinates of the actual scenery image onto which the extracted construction name is to be overlayed. The construction name is overlayed onto the sight image which is the actual scenery based on the label information, and displayed by means of a view visual device.

Furthermore, the sight labeling device according to the present invention may also be provided with communication address memory means for storing communication addresses of communication devices relating to the constructions (telephone number, fax number, IP address, email address, WWW page address, etc.), screen position indication means for indicating to the user a position on the screen of the visual device, and communication processing means for setting up a communication path with a communication address when the communication address is received. In this case, when the user indicates a position on the screen of the visual device, the screen position indication means determines the construction in the label information corresponding to the indicated screen position, receives the communication address of the communication device relating to the determined construction from the communication address memory means, and sends this to the communication processing means. The communication processing means is capable of setting up a communication path with the communication address based on the received communication address. As a result, the user is able to telephone, fax or email to residents in the construction of the label information simply by touching an area of the screen.

In the above-described structure, the structure may be such that when a user indicates a position on the screen of the visual device, the communication processing means first displays the received communication address information on the screen of the visual device, and the communication path with the communication address is set up depending on a communication start request of the user. Furthermore, it is possible to provide destination indication means for the user to indicate the destination, wherein the label information preparation means appends destination identifying information indicating that it is the destination to label information with respect to a destination indicated by the user, so that the label information output means will display that a construction matches the destination conditions when destination identifying information is appended to label information. Furthermore, when a user indicates a position on the screen of a visual device, a screen position indication means determines the construction in the label information corresponding to the designated screen position, receives the communication address of the communication device relating to the determined construction from the communication address memory means, and sends the communication address to the label information output means, so that the label information output means can overlay and display the received communication address information on the sight image.

In order to further raise the level of precision of correlation between constructions in the sight image and constructions in the CG image in the sight labeling device of the present invention, it is possible to use depth values, which are the distances from each point in the sight image to the camera position at the time the image was taken, for each point in the sight image. In the same manner, the depth values which are the distances from the points in each sub-domain of the CG image to the camera position at the time the image was taken are determined. For example, the ratio of the average of a group of depth values in each sub-domain of the CG image to the average of a group of depth values in each sub-domain of the sight image is determined. From this ratio, it is determined whether or not it is possible to correlate the sub-domain of the sight image with the sub-domain of the CG image. Alternatively, it is possible to determine the ratio of overlap between the sub-domains in the sight image and the sub-domains in the CG image, and to decide whether or not it is possible to correlate the sub-domain of the sight image with the sub-domain of the CG image from both the ratio of average depth and the ratio of overlap between the sub-domains. A CG image is prepared based on the captured constructions, the sub-domains in the CG image are correlated to sub-domains in the sight image by pattern matching, and the constructions on which the correlated sub-domains are based are determined. Of course, the ratio is not necessarily restricted to being of average depth values, and may be any statistical value obtained from the group of depths.

hereinbelow, an embodiment of the present invention shall be explained in detail with reference to the drawings.

FIG. 1 is a diagram showing the construction of a sight labeling terminal according to a first embodiment of the present invention.

The sight labeling device of the present embodiment comprises an image acquiring section 1 such as a digital camera for acquiring images, a position information acquiring section 2 such as a GPS (Global Positioning System) Receiver for recording the position of the camera while images are being taken, a camera descriptive information acquiring section 3 such as a three-dimensional electronic compass attached to the digital camera for recording the camera angle, focal distance and image size while images are being taken, a map information management section 5 such as a map DB management program for managing map information, determining the view space in the map information space based on the recorded position, camera angle, focal distance and image size and capturing the constructions present in the view space, a label information preparation section 6A for preparing label information including the names or profiles and positions of constructions, a label information output section 7A for overlaying the names or profiles in the map information at the positions in the images corresponding to the information regarding positions in the obtained label information and outputting the overlayed images to a visual device (not shown in the drawing), and a control section 8A for controlling the respective sections 1–7A.

Figure 2:
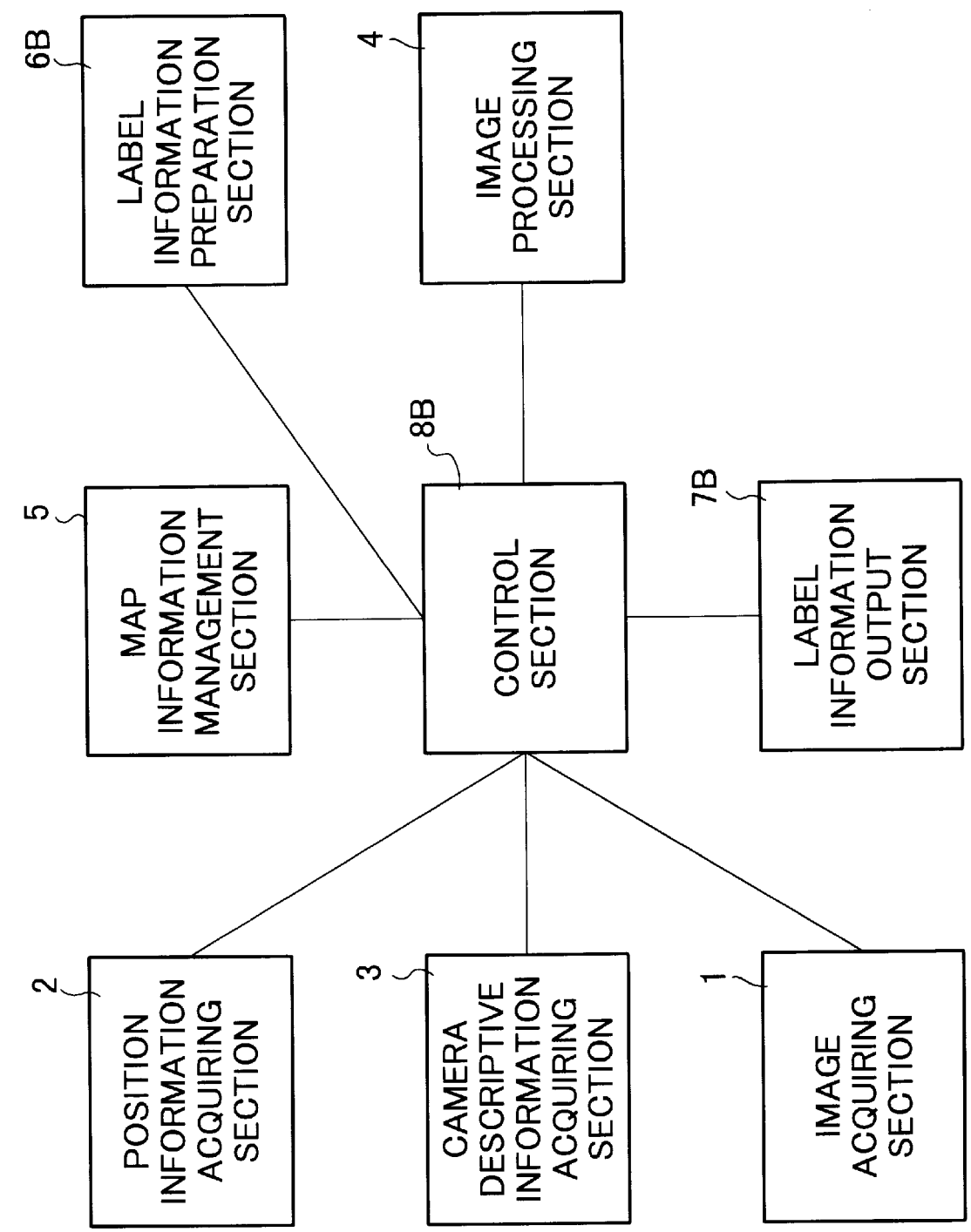
FIG. 2 is a diagram showing the structure of a sight labeling device according to a second embodiment of the present invention.
Figure 3:
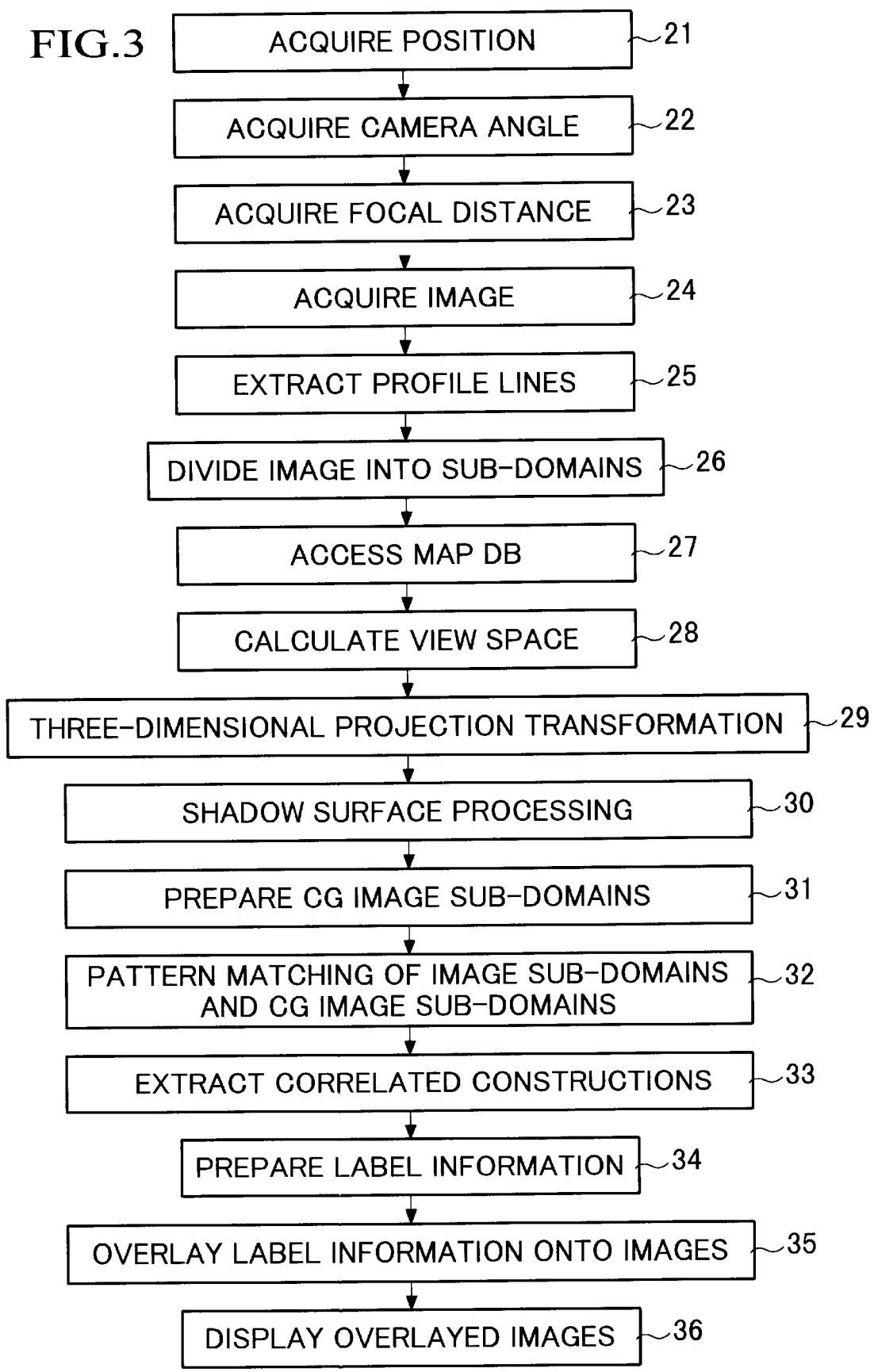
FIG. 3 is a flow chart showing the process carried out by the sight labeling device of the second embodiment of the present invention.

FIG. 2 is a diagram showing the structure of a sight labeling device according to a second embodiment of the present invention, and FIG. 3 is a flow chart showing the process carried out by the sight labeling device of FIG. 2. The second embodiment differs from the first embodiment by having an image processing section 4 for processing images taken by the image acquiring section 1 separate from the control section. Since the flow of the basic processes of the first embodiment shown in FIG. 1 and the second embodiment shown in FIG. 2 are identical, the operations of the embodiment shown in FIG. 2 shall be explained in detail, while the operations of the embodiment shown in FIG. 1 shall be omitted.

The sight labeling device of the embodiment shown in FIG. 2 comprises an image acquiring section 1 such as a digital camera for acquiring sight images, a position information acquiring section 2 such as a GPS receiver for recording the camera position while the images are being taken, a camera descriptive information acquiring section 3 such as a three-dimensional compass attached to the digital camera for recording the camera angle, focal distance and image size while the images are being taken, an image processing section 4 for dividing the taken images into a plurality of sub-domains, a map information management section 5 for managing the map information, determining the view space in the map information space based on the recorded position, camera angle, focal distance and image size, and capturing the constructions present in the view space, a label information preparation section 6B for correlating the constructions captured with respect to the sub-domains in the image by means of pattern matching and preparing label information including the names or descriptive information and transfer positions of the correlated constructions, a label information output section 7 for overlaying the names or descriptive information of the constructions in the generated label information at the corresponding positions in the image, a label information output section 7B for outputting the overlayed image to a visual device, and a control section 8 for controlling the respective sections 1–7B.

Next, the operations of the present embodiment shall be explained in detail with reference to FIG. 3. When the sight labeling device is activated, the control section 8B first sends procedure initiation commands to the position information acquiring section 2, the camera descriptive information acquiring section 3 and the image acquiring section in order to obtain information regarding the sight image. Upon receiving instructions from the control section 8, the position information acquiring section 2 collects position information from the GPS receiver or the like every second, and sends these to the control section 8B (step 21). Here, the time interval is not necessarily restricted to units of seconds. Upon receiving instructions from the control section 8, the image acquiring section 1 obtains sight images every second, and sends them to the control section 8B (step 22). Upon receiving the instructions from the control section 8, the camera descriptive information acquiring section 3 records the camera angle of the sight image acquiring device while the images are being taken as a pair of a horizontal angle and an elevation angle (step 23). Simultaneously, if the sight image device has a zoom capability, the focal distance is also obtained (step 24). Since the image size is standard for each sight image device, the control section 8B stores the image size information. The control section 8B stores the collected information as a sight image file.

FIG. 4 shows an example of a file format which is a data construction for sight image files. the sight image file shown in FIG. 4 has header information and image data. The header information includes position information, camera angle information, focal distance, time information, and image size, type and size of the image file. The position information includes east longitude, north latitude and elevation (e.g. 137° 55' 10" of east longitude; 34° 34' 30" of north latitude, and elevation 101 m, 33 cm). The camera angle includes the horizontal angle and the elevation angle (e.g. horizontal angle 254° clockwise, elevation angle 15°). The focal distance data includes the focal distance of the camera lens when the image is being filmed (e.g. 28 mm). The time information includes the time of filming (e.g. Jan. 31, 1997, 15:15 and 15 seconds, Japanese Standard Time). The image size of the image file includes the vertical and horizontal pixel size (e.g. 640×480). It also has the file type (e.g. TIFE format, 8-bit color format). It also contains the number of bytes in the file (e.g. 307.2 KB). The image data itself is stored, for example, in binary format.

After storing a sight image file, the control section 8B instructs the image processing section 4 to extract profile lines from the sight image and to divide the sight image into a plurality of sub-domains. In the image processing section 4, profile lines (border lines) are extracted by differential processing based on differences in concentration inside the sight image (step 25), and the sight image is divided into sub-domains by performing labeling with the profile lines as boundaries (step 26). The technical terminology of "labeling" used here is a technical term used in the sub-domain division of images, and is different from "sight-labeling" as used in the title of the invention. As a process, the image is first converted into a monochrome image. Since the profiles appear at portions with sudden changes in brightness, the profile lines are extracted by differential processing and determining the portions at which the differential values are larger than a threshold value. At this time, the line width of the profile lines should be a single pixel, and the profile lines should be connected. Therefore, a thinning process is performed connected lines having a line width of a single pixel. Here, the differential process and thinning process may be adequately performed by conventionally known methods.

Figure 9:
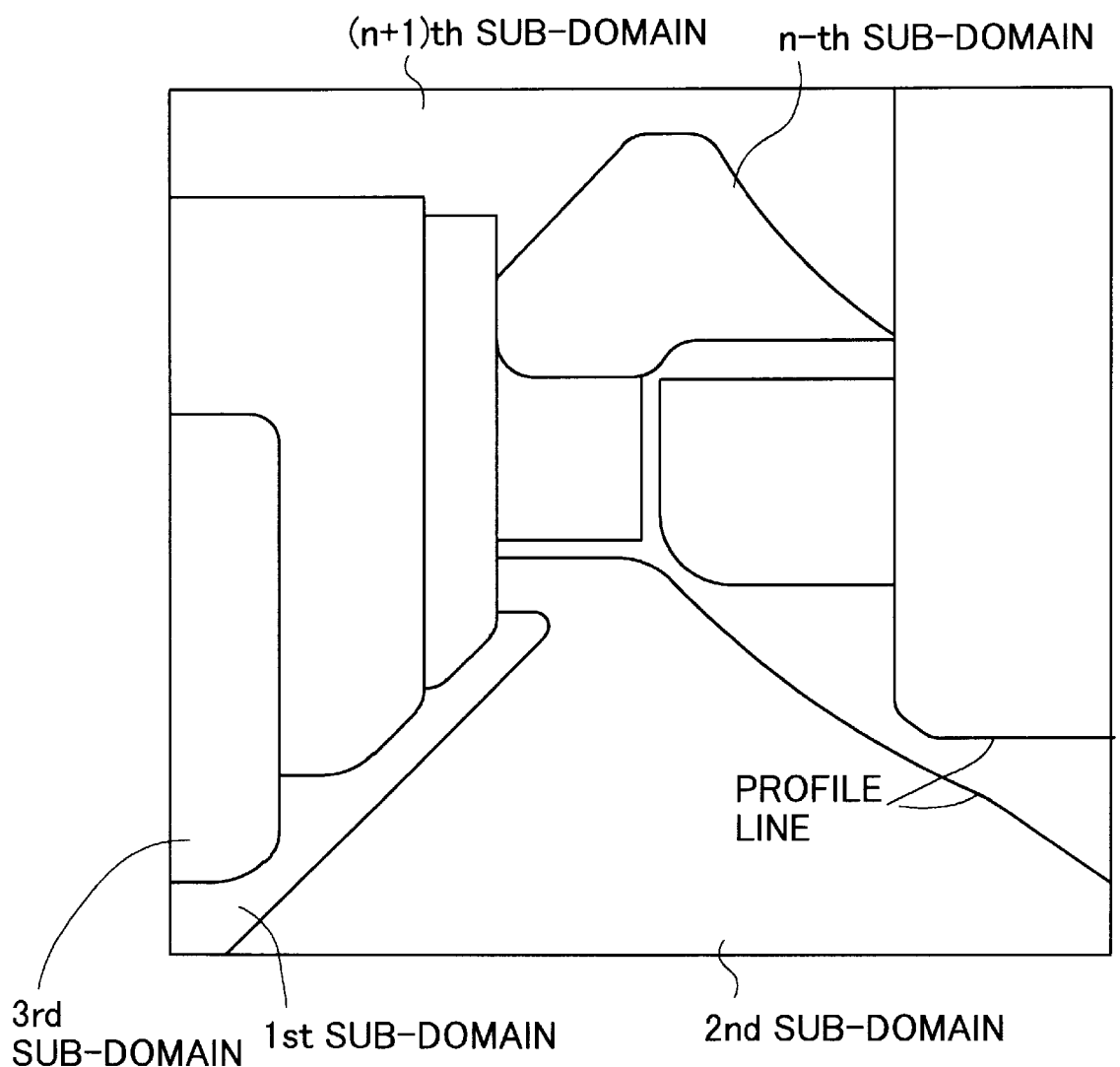
FIG. 9 is a diagram showing an example of the division of sub-domains in a sight image.

The resulting profile lines are considered to be profile lines of the sub-domains, and an operation is performed of numbering the sub-domains formed by the profile lines. The largest of the numbers equal to the number of sub-domains, and the number of pixels inside each sub-domain represents the area of the sub-domain. FIG. 9 shows an example wherein a sight image has been divided into a plurality of sub-domains. A measurement of the similarity (closeness) between sub-domains can be incorporated so as to perform a clustering process for organizing a plurality of sub-domains having similar properties into a single sub-domain. The clustering method may be of any existing method.

After the control section 8B completes the process of dividing the sight image into sub-domains, it sends header information for the sight image file with respect to the map information management section 5 and outputs processing requests to calculate the view space (step 27). As an example of a map information management section 5, there is a map database program. The map information management section 5 manages three-dimensional map data. Although two-dimensional map data is acceptable, there is no height information in this case, so that the precision of the transfer position of labeling to the actual scenery is decreased. When based on two-dimensional map data, processing is performed by supplementing height information. For example, in the case of two-dimensional data of houses, if floor number information representing the number of floors the houses have is available, then the height of each house can be estimated by multiplying the number of floors with a constant, and three-dimensional data can be prepared based on the height information determined by estimates of the two-dimensional data. Even if there is no floor information, height information can be estimated by allocating a standard height depending on the area of the house diagram or the lie, and preparing three-dimensional data based on estimated height information in a similar manner. The process progresses by preparing three-dimensional data in this way.

Figure 5:
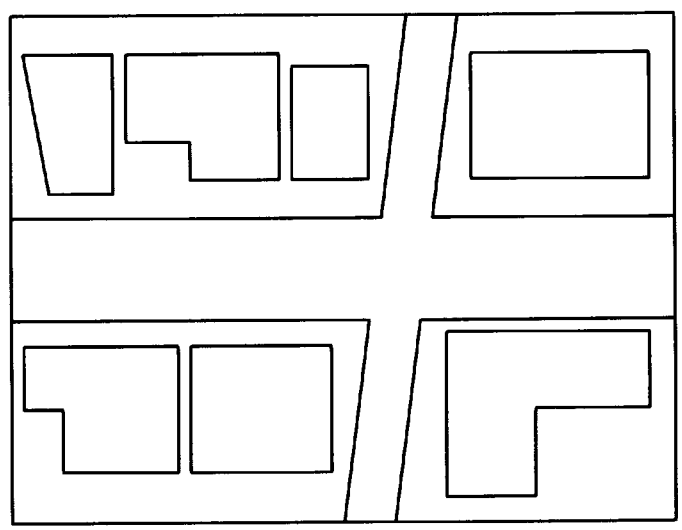
FIG. 5A is an example of a two-dimensional map.
FIG. 5B is an example of a three-dimensional map.
Figure 5:
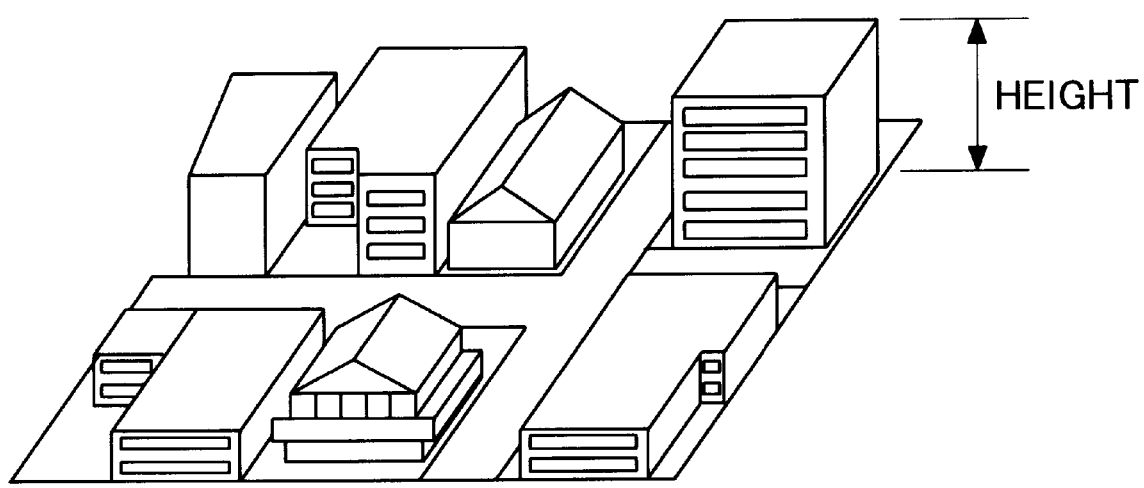
Figure 6:
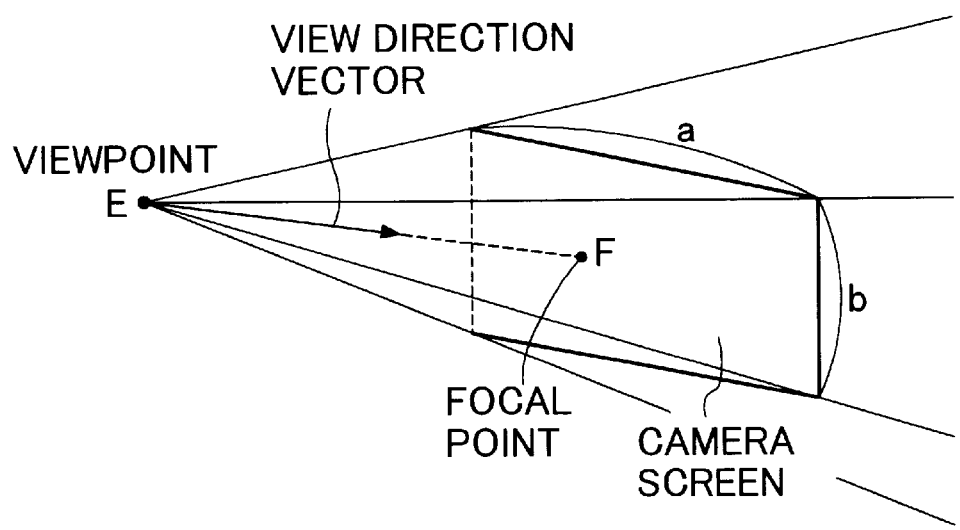
FIG. 6 is a diagram showing a method of calculating a view space.
Figure 7:
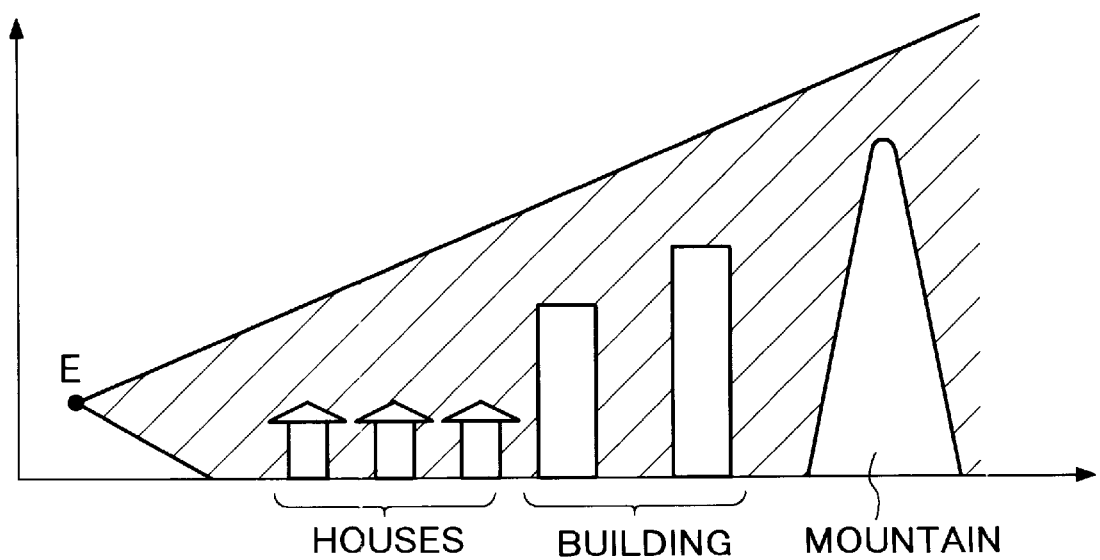
FIG. 7 is a diagram showing an example of a view space in a three-dimensional map space.

FIGS. 5A and 5B show examples of map data. FIG. 5A shows map information space expressed in two dimensions, and FIG. 5B shows map information space expressed in three dimensions. With this three-dimensional map information space, the map information management section 5 receives instructions from the control section 8B to calculate a view space based on header information for the sight image file (step 28). FIG. 6 shows an example of the calculation of a view space. First, XY axes are formed in the horizontal direction, and a Z axis is formed in the vertical direction. From the position information in the header information of the sight image file, the position of the viewpoint E is set inside the three-dimensional map information space. For example, if the point is at 137° 55' 10" of east longitude, 34° 34' 30" of north latitude and an elevation of 101 m 33 cm, the coordinates corresponding thereto in the map mesh numbers is set. Similarly, the camera angle direction is set based on the horizontal angle and elevation angle in the camera angle information of the header information. A focal point F is set at a point which is the focal distance in front of the viewpoint E along the line representing the camera angle. The view line direction vector is a unit vector originating from this viewpoint E along this line. Using the image size in the sight image file, the width a along the horizontal axis in the camera screen is set by the size in the horizontal direction and the width b along the vertical axis is set by the size in the vertical direction. The plane of horizontal a and vertical b is perpendicular to the camera angle direction with respect to the view direction vector, and is set so as to include the focal point F. The lines connecting the coordinates of the viewpoint E with the four corners of the camera screen are each determined, and the three-dimensional space formed by the four half-lines extending from the viewpoint E is considered to be the view space. FIG. 7 shows an example of the view space with a three-dimensional map space, wherein the three-dimensional map space is viewed from the XZ plane. The parts surrounded by the hatched lines in FIG. 7 are a cross section on the XZ plane of the space belonging tot he view space. In the example of FIG. 7, buildings and a mountain are contained in the view space.

Furthermore, the map information management section 5 determines the constructions existing in the determined view space. For each construction, it is determined whether or not the vertices forming the three-dimensional body representing the construction exists inside the view space. Normally, two-dimensional map spaces are divided by means of a two-dimensional mesh having a standard size. As the method of dividing the mesh in the three-dimensional space, the mesh is cut by standard intervals in the height direction in addition to the mesh in the vertical and horizontal two-dimensional directions. Thus, the space is divided into cubical unit spaces. First, each cubical unit space is analyzed for the existence of overlaps with the view space, and the numbers of the three-dimensional unit map spaces having overlaps are determined. Here, the number of the three-dimensional unit map space is similar to a mesh number. The constructions inside three-dimensional unit map spaces having overlaps are analyzed for the existence of portions overlapping the view space. The lines connecting the coordinates of the vertices forming the constructions and the coordinates of the viewpoint are determined, and they lie within the view space if the lines have an intersection with the camera screen of FIG. 8. Of the plurality of vertices forming a construction, if even one of the vertices fulfills this condition, that construction is held to have a portion overlapping the view space.

Figure 8:
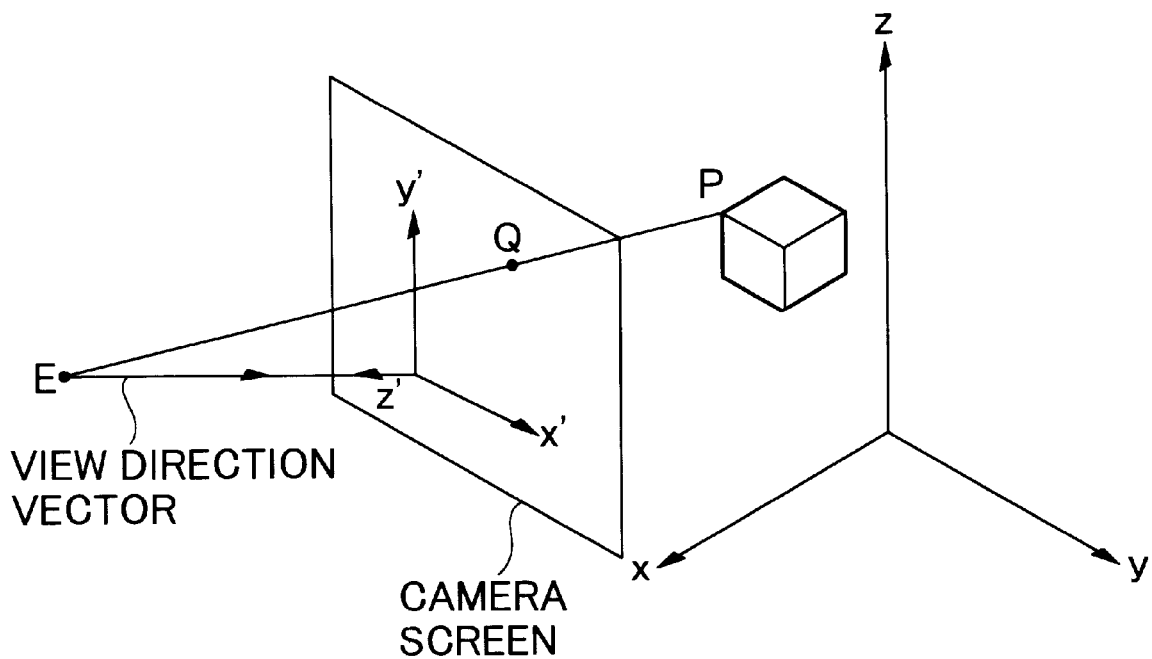
FIG. 8 is a diagram showing an example of a projection.

When constructions or parts thereof are contained inside the view space, a three-dimensional projection transformation is performed on each construction with the camera screen as the projection plane (step 29). Here, as shown in FIG. 8, after expressing point P in a coordinate system based on viewpoint E using the following equation (1), the intersection Q is determined by projecting point P onto the camera screen.

$$\begin{pmatrix} x' \\ y' \\ z' \end{pmatrix} = \begin{pmatrix} -\frac{ly}{r} & \frac{lx}{r} & 0 \\ -\frac{lxlz}{r} & -\frac{lylz}{r} & r \\ lx & ly & lz \end{pmatrix} \begin{pmatrix} x - ex + lxt \\ y - ey + lyt \\ z - ez + lzt \end{pmatrix} \quad (1)$$

$$\begin{pmatrix} X \\ Y \end{pmatrix} = \begin{pmatrix} \frac{t}{t - z'} \\ \frac{t}{t - z'} \end{pmatrix} \begin{pmatrix} x' \\ y' \end{pmatrix} \quad (2)$$

wherein
point P=(x, y, z); coordinates of vertex forming construction
point E=(ex, ey, ez); coordinates of viewpoint
vector L=(lx, ly, lz); view direction vector (unit vector)
point P'=(x', y', z'); coordinates of point P expressed in coordinate system based on viewpoint E
$r = (lx^2 + ly^2)^{1/2}$
intersection Q=(X, Y); projection of point P onto camera screen t is the focal distance.

For the three-dimensional projection transformation, the planes formed by the vertices of each construction are determined. For example, if the construction is expressed by a cube, then six planes will be determined. When projection transforming each plane onto the camera screen, the distance from the viewpoint to the corresponding point on the camera surface is measured with respect to each pixel on the camera surface contained in the projected sub-domain, and is stored in the memory as a depth value (Z value). The depth value (Z value) is calculated for each pixel on the camera screen for each plane of each construction, and stored in the memory. In Equation (1), z' represents the depth value (A value) from the viewpoint.

Of the constructions which are three-dimensionally projection transformed onto the camera screen, there are constructions which can be seen from the viewpoint and constructions which cannot be seen from the viewpoint. Among these, there is a need to determine only the constructions capable of being seen from the viewpoint, and to determine the planes which are on the opposite side from the viewpoint or are obstructed by other constructions. Therefore, an occluded plane process is performed (step 30). There are many types of methods for processing occluded planes; for example, a Z buffer method may be used. Other possible methods include scan line methods or ray tracing methods.

Taking an arbitrary pixel on the camera screen, the plane having the minimum depth value with respect to that pixel is determined. After repetitively processing each plane of each construction in this manner, the plane which is closest to the viewpoint for each pixel on the camera screen remains. The plane closest to the viewpoint is found for each pixel on the camera screen, and since the pixels on the camera screen having a common plane closest to the viewpoint usually form a sub-domain, a plurality of sub-domains composed of pixels which have a common plane as the closest plane are formed on the camera screen. The sub-domains determined in this way are sub-domains which result from three-dimensional transformation of the sub-domains of the constructions as seen from the viewpoint. The planes which are on the opposite side from the viewpoint or are obstructed by other constructions are eliminated.

The sub-domains formed in this way form CG image domains (step 31).

With respect to the coordinates of the vertices of the two-dimensional forms forming the CG image sub-domains, the three-dimensional coordinates prior to projection transformation are determined, and the correspondence between these is stored in memory as link information. The link information is used to determine of which construction the two-dimensional sub-domain is a projection.

Figure 10:
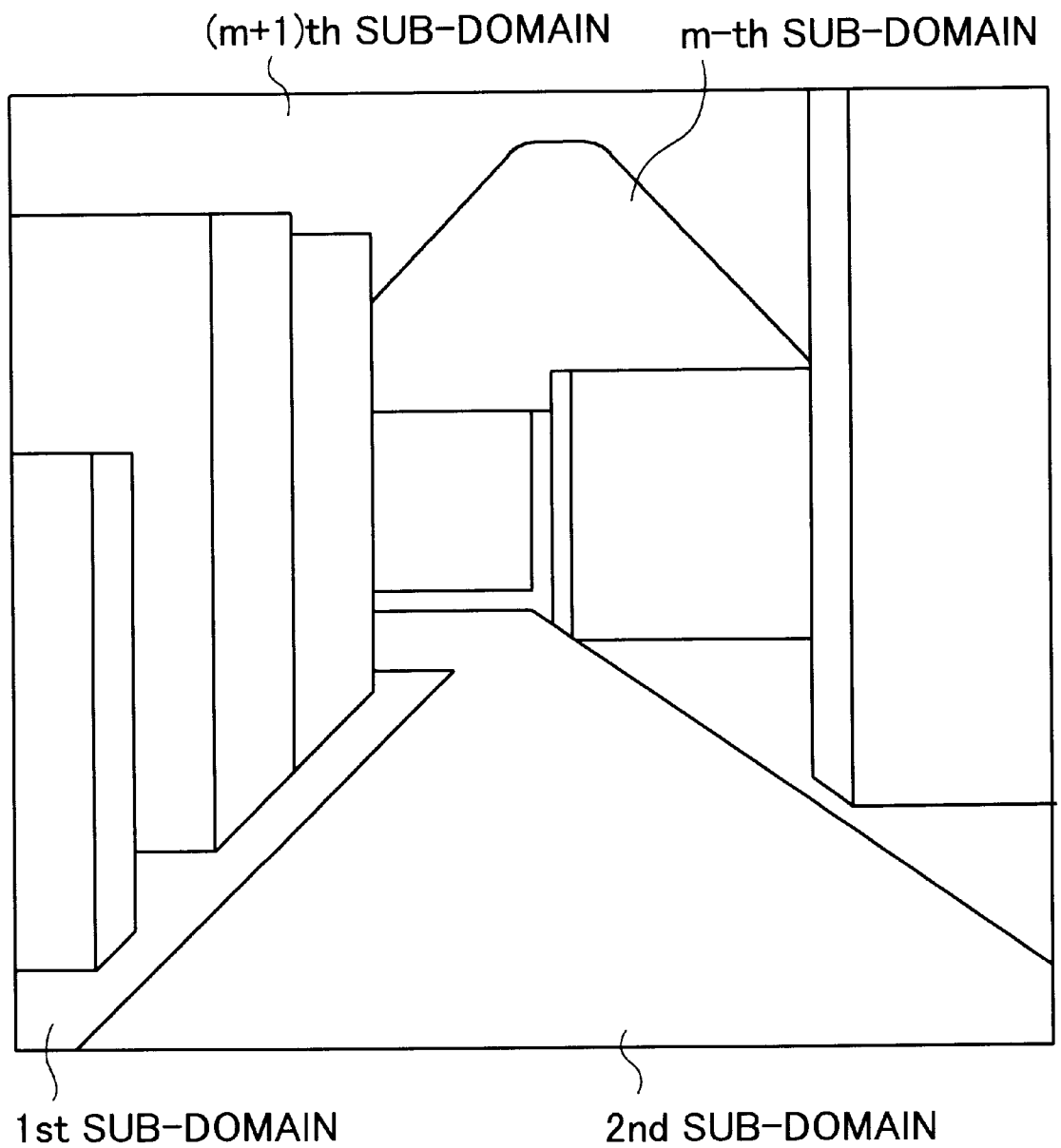
FIG. 10 is a diagram showing the division of sub-domains in a CG image.

Based on the line data remaining after elimination of occluded lines, the CG image is divided into sub-domains. Since a three-dimensional map DB is used, it is possible to correlate each sub-domain with the name of the construction which is the basis for the sub-domain. The divided sub-domains of the CG image are numbered in order. FIG. 10 shows an example wherein the CG image is divided into a plurality of sub-domains.

After the process of dividing the CG image into sub-domains is completed, the control section 8B instructs the label information preparation section 6B to correlate the sub-domains of the CG image with the sub-domains of the sight image (step 32). The label information preparation section 6B correlates the sub-domains of the CG image with the sub-domains of the sight image by means of template matching (step 33, see FIG. 11).

The sub-domains of the sight image are correlated with the sub-domains of the CG image, proceeding in order from the sub-domain with the smallest number (for example, number 1). While it is possible to use any conventional matching method for the correlations, a simple template matching method is used in this case. That is, when the ratio of portions which overlap between two sub-domains under comparison is greater than or equal to a constant ratio which has been decided as being a threshold value, they are correlated as being sub-domains relating to the same construction. For example, in a first sub-domain R1 of a sight image, the coordinate values of each pixel in the sub-domain are taken as being (A, B). The value of the pixel at coordinates (A, B) is 1 for being inside the sub-domain. In the first sub-domain S1 of the CG image, if the coordinates (A, b) are inside the sub-domain S1 then the pixel value is 1 and there is overlap, but if they are outside of S1, then the pixel value is 0 and there is no overlap. Thus, the overlap coefficient K(A, B) at the coordinates (A, B) is 1 in the case of overlap, and 0 in the case of no overlap. The overlap coefficients K(A, B) are determined by moving the coordinates (A, B) inside the sub-domain R1. Of the number N1 of coordinates (A, B) moved inside the sub-domain R1, the number N2 of coordinates at which the overlap coefficient K(A, B) is 1 is determined, and if N2/N1 is greater than or equal to a threshold value, the sub-domain R1 of the sight image is determined as corresponding to the sub-domain S1 of the CG image. This correlation is determined for the first to last sub-domain of the sight image. As another matching method, it is possible to use an evaluation function such that they will have the same value even if there is a slight positional misalignment in the XY direction.

After correlating the sub-domains of the CG image with the sub-domains of the sight image, the label information preparation section 6B enters a process of determining the information to be overlayed for each sub-domain of the sight image and preparing it along with the position to be overlayed as label information (step 34). First, the sub-domains of the CG image corresponding to the sub-domains of the sight image are extracted. The extracted sub-domains of the CG image are originally obtained by three-dimensional projection transformation of a plane of a three-dimensional construction in the three-dimensional map space onto the camera screen. Thus, the plane of the three-dimensional construction which is the basis of the three-dimensional projection transformation is determined with the depth value (Z value) of the sub-domain in the CG image as the key. Based on the plane of the construction which forms the basis, the three-dimensional map DB is accessed to obtain the name or descriptive information of the construction. Here, descriptive information refers to any information associated with the construction, and may be any information relating to the construction. The positional coordinates at which the name or descriptive information is to be overlayed are determined with respect to the sub-domains of the sight images. The method of determination can be any method. For example, they may be at the center of gravity of the shape forming the sub-domain. Label information is prepared from the name of the construction, descriptive information and transfer position coordinates. Table 1 shows an example of label information.

TABLE 1

| Construction Name | Overlay Position | Font Size |
| --- | --- | --- |
| Mt. Fuji | (300, 500) | 10 |
| Building A | (450, 250) | 10 |
| Building B | (150, 200) | 12 |

After preparing the label information, the label information preparation section 6B sends the label information to the control section 8B.

Figure 12:
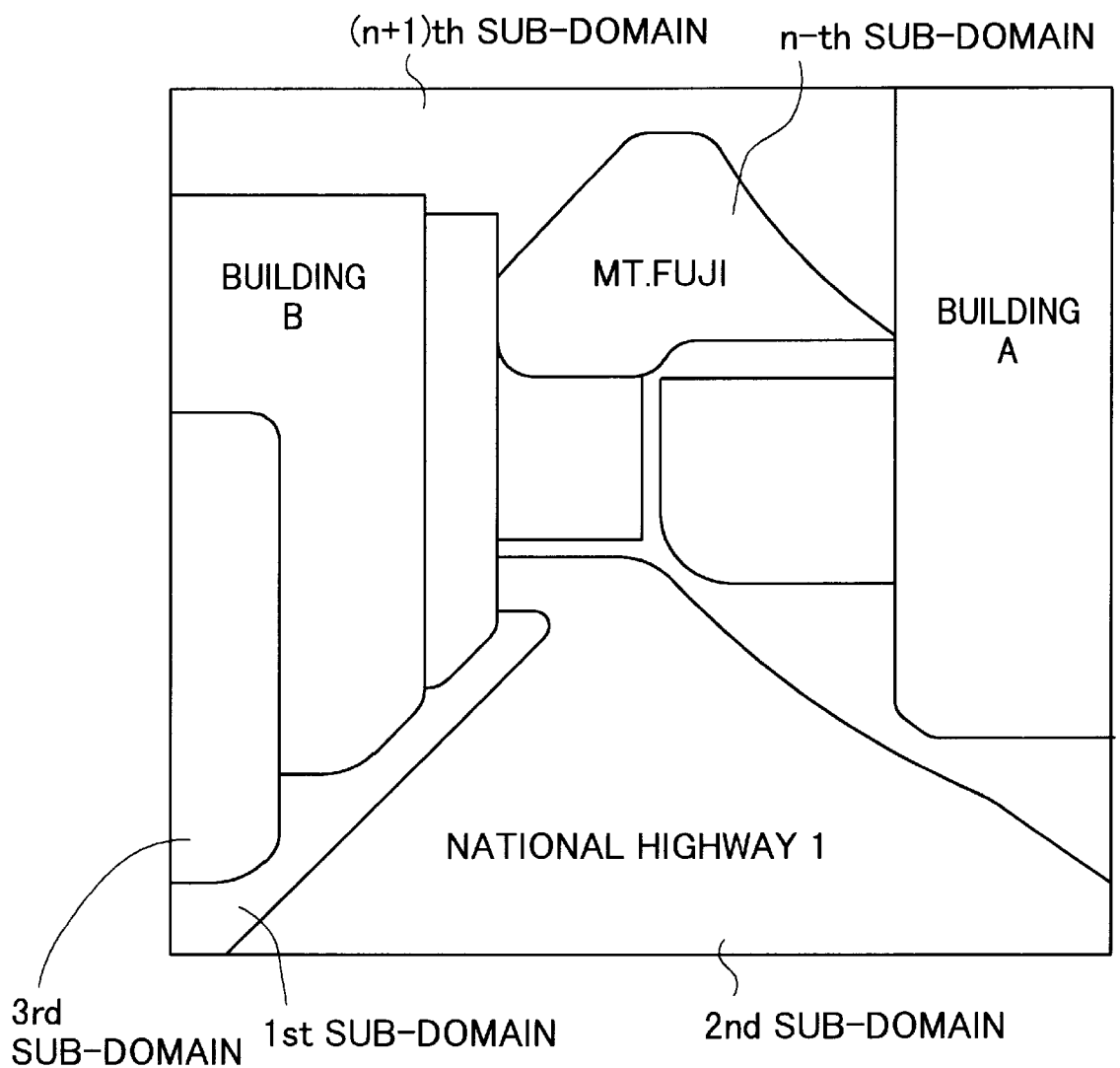
FIG. 12 is a diagram showing an example of overlaying label information on a sight image.

Upon receiving the label information, the control section 8B instructs the label information output section 7B to output label information to the visual device for display or the like. Here, the visual device includes any video image display device such as a display or a head-mounted display. The names or descriptive information of the constructions in the label information are overlayed at positions in the sight image (step 35), and the overlayed sight image is output to the video image display device (step 36). FIG. 12 shows an example of a sight image overlayed with label information.

After the label information output section 7B outputs the label information, the control section 8B is notified of the completion of output. After the control section 8B receives the output completion notification, it once again repeats the procedures indicated above for performing sight labeling.

Figure 13:
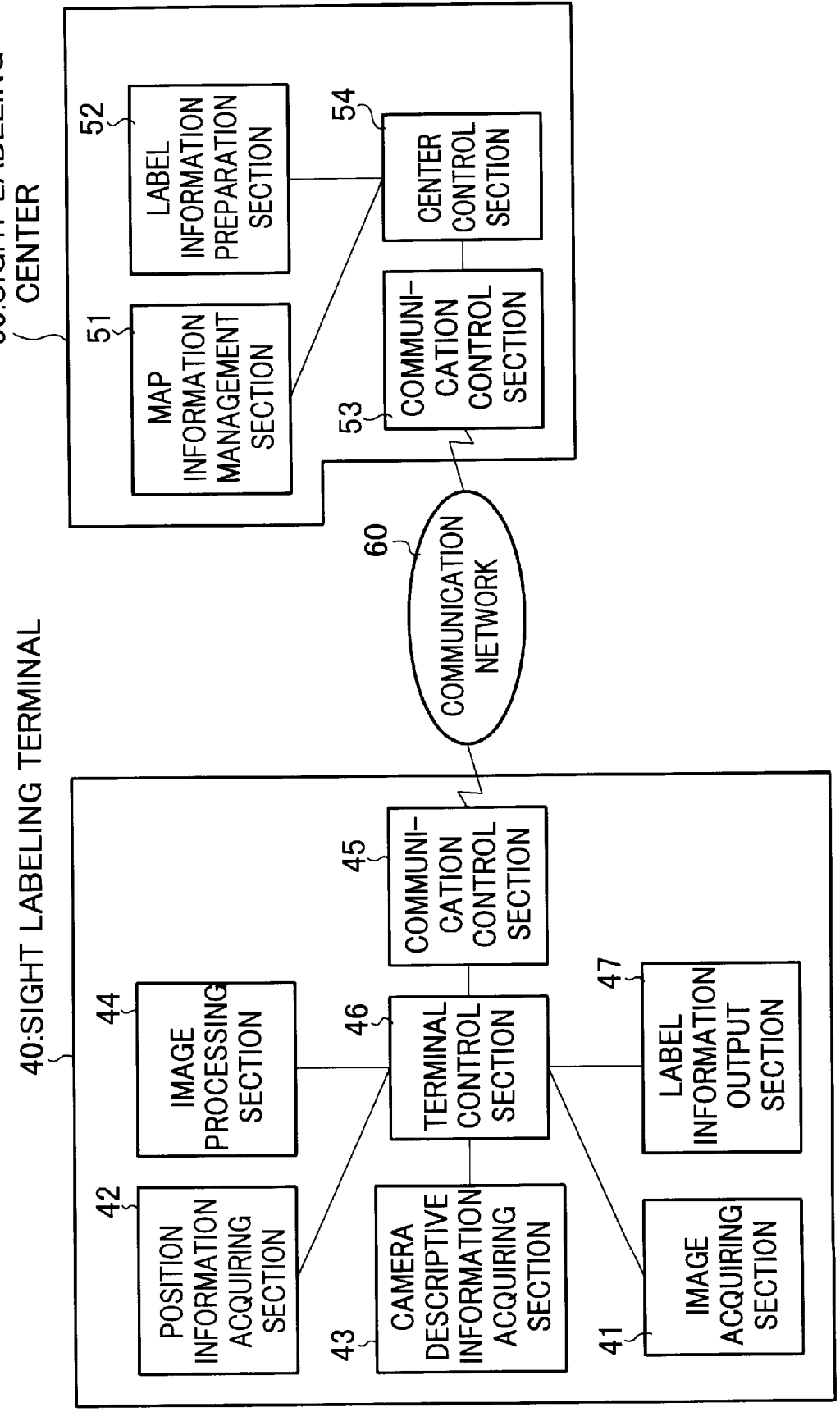
FIG. 13 is a diagram showing the structure of a sight labeling system of the present invention.

Next, an example wherein the sight labeling device of the present invention is applied to a communication system shall be explained. FIG. 13 is a diagram showing the structure of a sight labeling system wherein the sight labeling device of FIG. 2 is applied to a communication system. The sight labeling system comprises a sight labeling terminal 40, a sight labeling center 50 and a communication network 60.

The sight labeling terminal 40 comprises an image acquiring section 41 for acquiring images, a position information acquiring section 41 for acquiring position information while the images are being taken, a camera descriptive information acquiring section 43 for acquiring the camera angle, focal distance and image size while the images are being taken, an image processing section 44 for dividing the acquired images into a plurality of sub-domains, communication control means 45 for sending information relating to the division of the images into sub-domains, the camera angle, focal distance and image size through a communication network 60 to a sight labeling center 50 and receiving label information from the sight labeling center 50, label output means 47 for overlaying the names or descriptive information of constructions in the label information at corresponding positions in the images, and outputting the overlayed images to a visual device, and a terminal control section 46 for controlling the above-described sections.

The sight labeling center 50 comprises a communication control section 53 for receiving information relating to division of the images into sub-domains, the camera angle, focal distance and image size from the sight labeling terminal 40 through the communication network 60, and sending label information to the sight labeling terminal 40, a map information management section 51 for managing map information, determining the view space in the map information space based on the received values for the camera angle, focal distance and image size, and capturing the constructions present inside the view space, a label information preparation section 52 for correlating the sub-domains in the images to the captured constructions by pattern matching and preparing label information including the names or descriptive information of the constructions and the corresponding transfer positions, and a center control section 54 for controlling the above-described sections.

The label information preparation section 52 may have the same structure as the label information preparation section 6B in FIG. 2.

Next, a third embodiment of a sight labeling device according to the present invention shall be explained with reference to the drawings.

Figure 14:
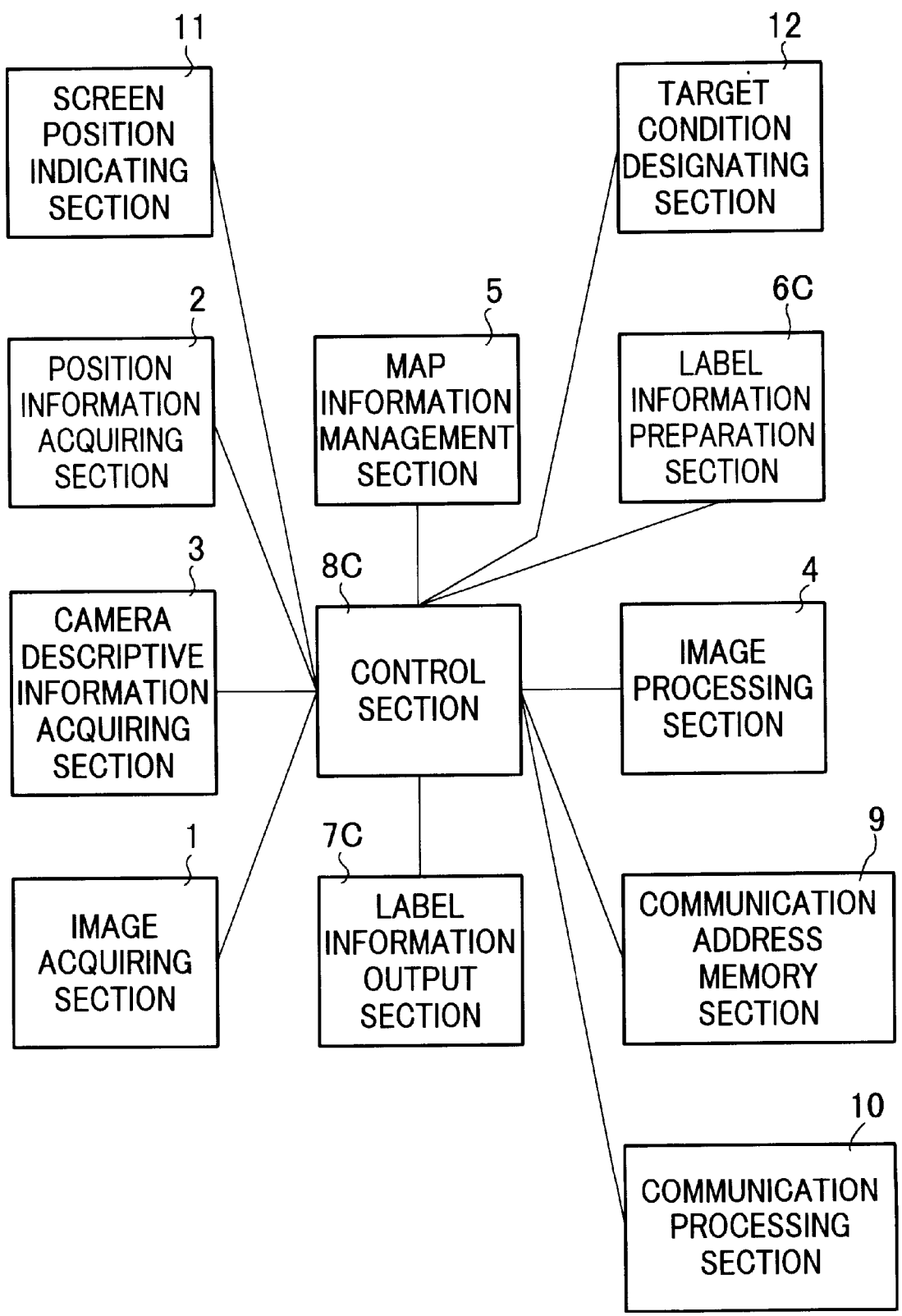
FIG. 14 is a diagram showing the structure of a sight labeling device of a third embodiment of the present invention.
Figure 15:
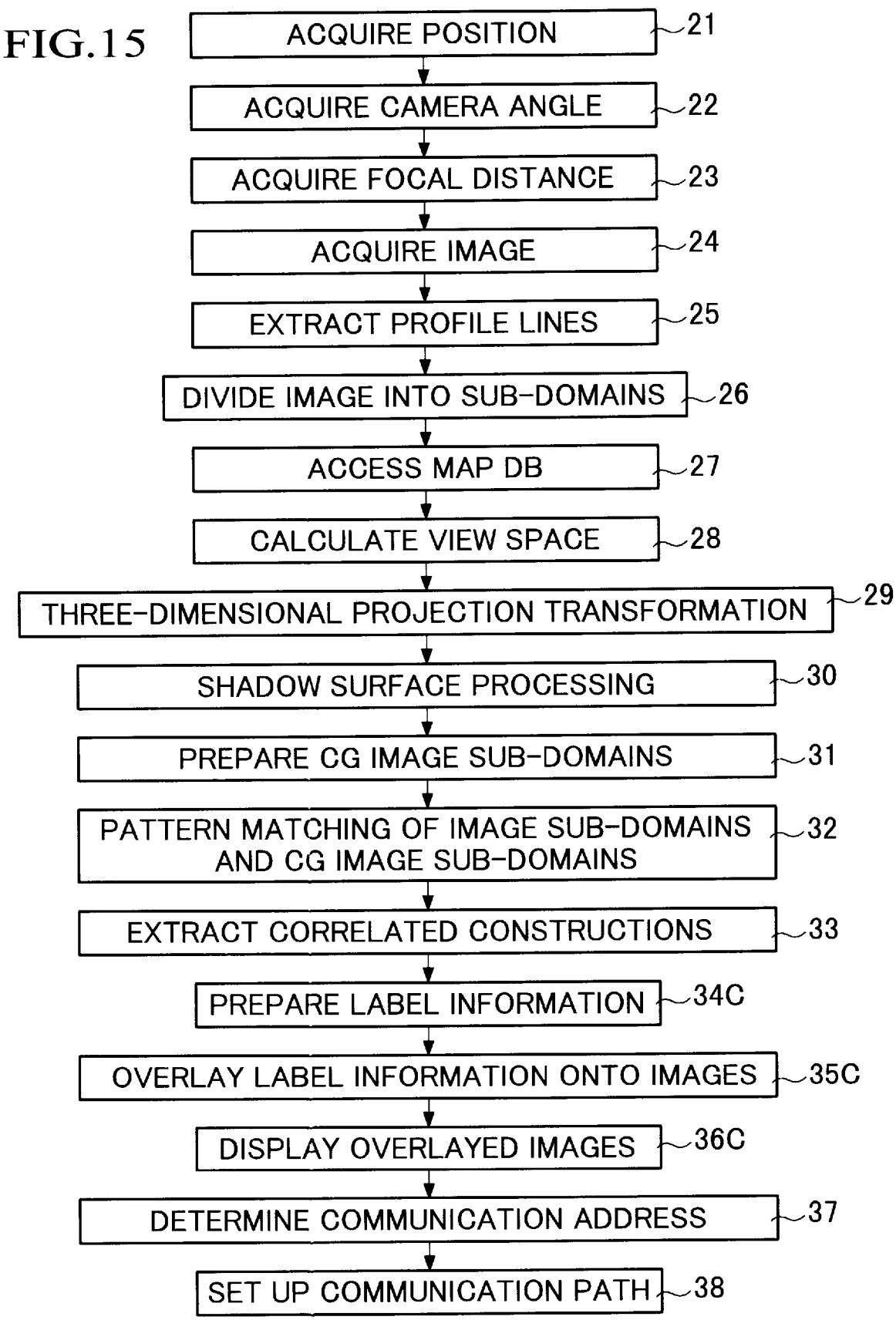
FIG. 15 is a flow chart showing the process carried out by the sight labeling device of FIG. 14.

FIG. 14 is a diagram showing the structure of the sight labeling device of the third embodiment of the present invention, and FIG. 15 is a flow chart showing the process carried out by the sight labeling device of FIG. 14. In FIGS. 14 and 15, the elements which are identical to those in FIGS. 1–3 are denoted by the same reference numbers.

As shown in FIG. 14, the sight labeling device of the present embodiment comprises an image acquiring section 1 such as a digital camera for taking sight images, a position information acquiring section 2 such as a GPS receiver for recording the camera position while the images are being taken, a camera descriptive information acquiring section 3 such as a three-dimensional electronic compass attached to the digital camera for recording the camera angle, focal distance and image size while the images are being taken, an image processing section 4 for dividing the taken images into a plurality of sub-domains, a map information management section 5 for managing the map information, determining the view space in the map information space based on the acquired camera position, camera angle, focal distance and image size, and capturing the constructions present inside the view space, a screen position indicating section 11 capable of allowing a user to indicate a position on the screen of the visual device, for determining the construction among the label information corresponding to a indicated screen position when a user indicates a position on the screen of the visual device, determining the communication address of the communication device relating to the determined construction from a communication address memory section 9, and sending the communication address to a communication processing section 10, a label information preparation section 6C for correlating the captured constructions with the sub-domains in the image and preparing label information including the name or descriptive information and transfer position of the corresponding construction, a label information output section 7C for overlaying the names and descriptive information of constructions at positions in the image corresponding to the transfer positions in the acquired label information, a communication address memory section 9 storing the communication addresses of communication devices relating to the constructions, a communication processing section 10 receiving a communication address and for setting up a communication path with the communication address, a target condition designating section 12 for allowing the user to designate target conditions, and a control section 8C for controlling these sections 1–7C and 9–12.

Next, the operations of the third embodiment shall be explained in detail with reference to FIG. 15. In the process shown in FIG. 15, the procedures which differ from those of the second embodiment shown in FIG. 2 are step 34C and the subsequent steps. When the device is activated, the control section 8C performs the procedures of steps 21–33 as described above, to correlate the sub-domains of the CG image with the sub-domains of the sight image.

After correlating the sub-domains of the CG image with the sub-domains of the sight image, the label information preparation section 6C enters a procedure of determining the information to be overlayed with respect to each sub-domain of the sight image, and preparing these together with the positions at which they are to be overlayed as label information (step 34C). First, in the same manner as the example described above, the sub-domain of the corresponding CG image is extracted with respect to each sub-domain of the sight image. The extracted sub-domain of the CG image is originally obtained by a three-dimensional projection transformation of a plane of a three-dimensional construction inside a three-dimensional map space onto the camera screen. The plane of the three-dimensional construction which is the basis of the three-dimensional projection transformation is determined using the depth value (Z value) of the sub-domain of the CG image as a key. The link information which was prepared during the three-dimensional transformation may also be used as a key. Using the plane of the original construction, the three-dimensional map DB is accessed to obtain the name or descriptive information of the construction. Here, descriptive information refers to information associated with the construction, and may be any information which relates to the construction. Then, the positional coordinates at which the name or descriptive information is to be overlayed are determined with respect to the sub-domain of the sight image. The method of determination may be any method. For example, it may be the center of gravity of the shape formed by the sub-domain. The label information is prepared from the name or descriptive information of the construction and the positional coordinates (step 34C). At this time, in the present embodiment, the construction which is a target condition designated by the user in the target condition designating section 12 is given a destination identifying flag "1" to indicate that it is a target condition. An example of label information is shown in Table 2.

TABLE 2

| Construction Name | Overlay Position | Font Size | Target Ident. Flag |
|---|---|---|---|
| Mt. Fuji | (300, 500) | 10 | 0 |
| Building A | (450, 250) | 10 | 1 |
| Building B | (150, 200) | 12 | 0 |

After completing preparation of the label information, the label information preparation section 6C sends the label information to the control section 8C.

Upon receiving the label information, the control section 8C instructs the label information output section 7C to display the label information on the visual device. Here, the visual device may include video display devices such as a display or a head-mounted display. The label information output section 7C overlays the names or descriptive information of construction in the label information at the positions in the sight image (step 35C), then displays the overlayed sight image on the video display device (step 36C). In this case, the construction having a destination identifying flag "1" is shown as matching the target conditions.

When a user indicates a position on the screen of the visual device by means of the screen position indicating section 11, the control section 8C determines the construction corresponding to the indicated screen position from among the label information, determines the communication address of the communication device relating to the determined construction from the communication address memory section 9, and sends the communication address to the communication processing section 10 (step 37). The communication processing section 10 first displays the received communication address information on the screen of the visual device, then sets up a communication path with that communication address in response to a communication initiation request of the user (step 38).

The communication address may also be displayed on the screen of the visual device by the label information output section 7C without sending it to the communication processing section 10.

When the sight labeling procedure is to be performed continuously, the procedures described above are repeatedly performed.

Figure 16:
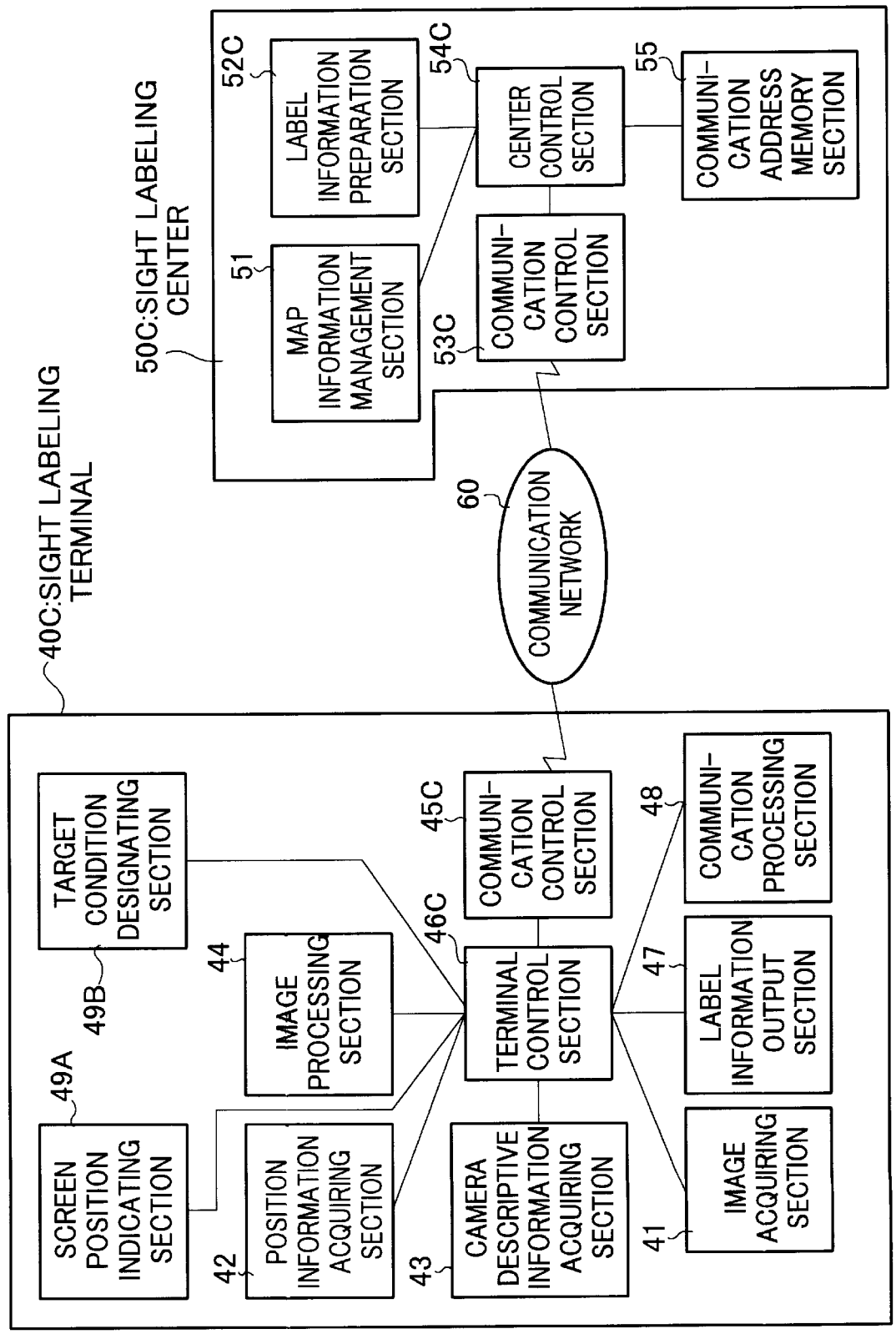
FIG. 16 is a diagram showing the structure of a sight communication system of the present invention using the third embodiment.

FIG. 16 is a diagram showing the structure of a sight labeling system wherein the sight labeling device of FIG. 14 is applied to a communication system. The sight labeling system shown in FIG. 16 comprises a communication terminal 40C, a communication center 50C and a communication network 60. In FIG. 16, the elements which are identical to those in FIG. 13 are denoted by the same reference numbers.

The communication terminal 40C comprises an image acquiring section 41 for taking images, a position information acquiring section 42 for recording the camera position while the images are being taken, a camera descriptive information acquiring section 43 for obtaining the camera angle, focal distance and image size while the images are being taken, an image processing section 44 for dividing the obtained images into a plurality of sub-domains, a communication control section 45C for sending information relating to the division of the images into sub-domains, the camera position, camera angle, focal distance, image size, destination identifying information indicating that a location or building is a destination and information about constructions in the label information through a communication network 60 to a communication center 50C, and receiving label information and communication addresses from the communication center 50C, a label information output section 47 for overlaying the names or descriptive information of constructions in the label information at transfer positions in the images, outputting the overlayed images to a visual device, and displaying that a construction is the location or building which is the destination if the destination identifying flag in the label information is "1", a communication processing section 48 for receiving a communication address and setting up a path to that communication address, a screen position indicating section 49A for enabling a user to indicate a position on the screen of the visual device, determining a construction in the label information corresponding to an indicated screen position when a user indicates a position on the screen of the visual device, outputting information on that construction to the communication control section 45C, and sending a communication address of the communication device relating to the construction received at the communication control section 45C to the communication processing section 48, a target condition designating section 49B for enabling a user to designate target conditions, and a terminal control section 46C.

The communication center 50C comprises a communication control section 53C for receiving information relating to the division of the images into sub-domains, the camera position, camera angle, focal distance, image size, destination identifying information and information about the constructions in the label information from the communication terminal 40C through the communication network 60, and sending label information and communication addresses to the communication terminal 40C, a map information management section 51 for managing map information, determining a view space inside the map information space based on the received camera position, camera angle, focal distance and image size, and capturing constructions present inside the view space, a communication address memory section 55 for storing the communication address of the communication device relating to each construction, and outputting the communication addresses of constructions indicated by the information for constructions in the label information, a label information preparation section 52C for correlating the captured constructions with respect to the sub-domains of the image by means of pattern matching, preparing label information including the names or descriptive information of the correlated constructions and the transfer positions, and making a destination identifying flag "1" if the construction is a location or construction which is designated by the user as being a destination (if destination identifying information has been received), and a center control section 54C for controlling the above-described sections.

Figure 17:
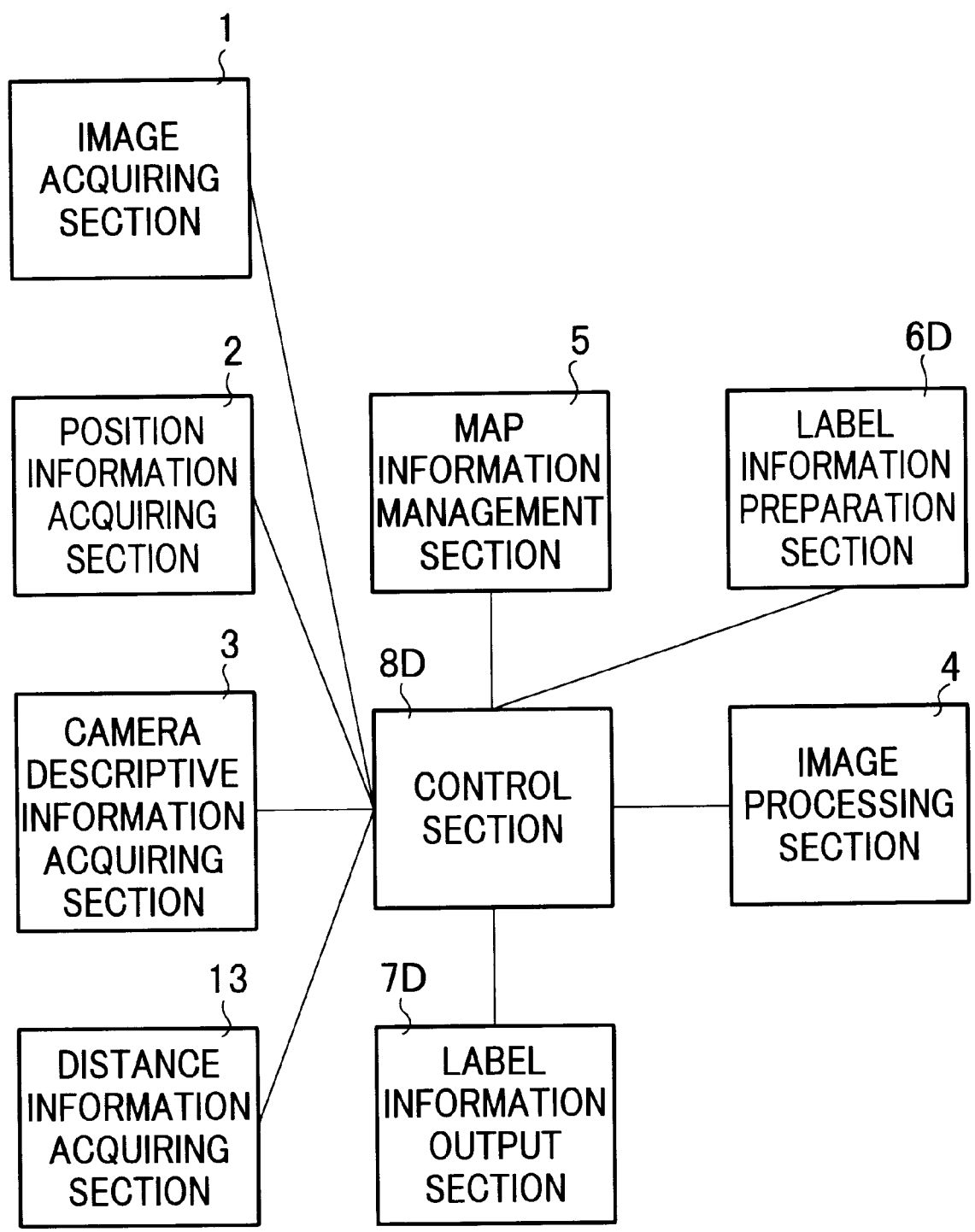
FIG. 17 is a diagram showing the structure of a distance-reference sight labeling device of a fourth embodiment of the present invention.
Figure 18:
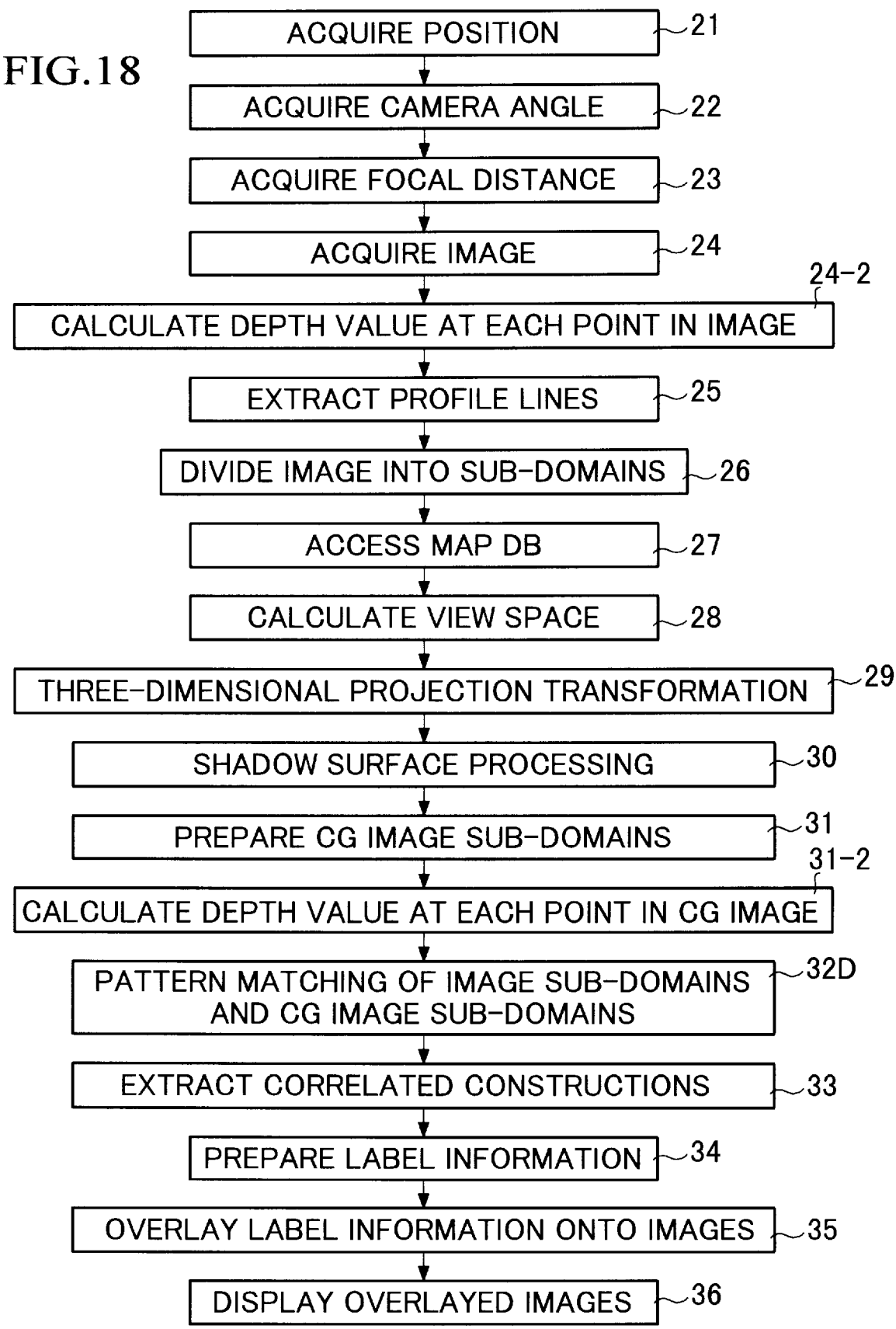
FIG. 18 is a flow chart showing the process carried out by a sight labeling device of the embodiment of FIG. 17.

Next, a fourth embodiment of the present invention shall be explained with reference to the drawings. FIG. 17 is a diagram showing the structure of a sight labeling device according to the fourth embodiment of the present invention, and FIG. 18 is a flow chart showing the process carried out by the sight labeling device of FIG. 17. In FIGS. 17 and 18, the elements which are identical to those shown in FIGS. 2 and 3 are denoted by the same reference numbers.

The sight labeling device of the fourth embodiment shown in FIG. 17 comprises an image acquiring section 1 such as a digital camera for taking images, a position information acquiring section 2 such as a GPS receiver for recording the position of the image acquiring section 1 while the images are being taken, a camera descriptive information acquiring section 3 such as a three-dimensional electronic compass attached to the digital camera for recording the camera angle, focal distance and image size while the image acquiring section 1 is taking images, an image processing section 4 for dividing the obtained images into a plurality of sub-domains, a distance information acquiring section 13 for determining the distances (depth values) to each point in the images for each sub-domain of the images with respect to the camera position while the images are being taken, a map information management section 5 for managing map information, determining a view space inside the map information space based on the obtained position (camera position), camera angle, focal distance and image size, and capturing the constructions present inside the view space, a label information preparation section 6D for preparing a CG image based on constructions captured by the map information management section 5, then determining the depth which is the distance to each point of each sub-domain in the CG image with respect to the camera position while the images are being taken, correlating the sub-domains of the image with the sub-domains of the CG image by pattern matching according to a ratio between groups of average depth values for the points in each sub-domain of the CG image and groups of depth values for the points in each sub-domain of the image, and preparing label information including the names or descriptive information of the correlated constructions and transfer positions, a label information output section 7 for overlaying the names or descriptive information of constructions inside the prepared label information at positions corresponding to the transfer positions inside the image, and outputting the overlayed image to a visual device, and a control section 8D for controlling the sections 1–5, 6D, 7D and 13 described above.

The distance information acquiring section 13 uses conventional art relating to three-dimensional measuring methods to determine the distances between each point in the sub-domains of the sight images obtained by the image acquiring section 1 and the image acquiring section 1 (camera position) when the images are being handled. In this case, an example of a reference document relating to conventional methods of three-dimensional measurement is *The Journal of the Image Electronics Society*, vol. 24, no. 5, pp. 474–482 (Japanese). This publication explains methods such as light radar methods (pulsed light projection and modulated light projection), single-eye perspective methods, stereo image methods and active stereo methods (slit light projection and pattern light projection). For example, the pulsed light projection method is a method wherein distances are determined by projecting a light pulse and measuring the time until it is reflected and returned, and the modulated light projection method is a method wherein distances are determined by projecting a light beam having an intensity which is temporally modulated by a sine wave or a rectangular wave and finding the phase difference with the reflected wave. The stereo image method is a method wherein a three- dimensional position is determined by applying triangulation between images obtained from a plurality of cameras, the slit light projection method is a method wherein distances are determined by triangulation of positions of images formed by projecting slit light, and the pattern light projection method is a method for obtaining precise distance images from a smaller number of images by coding the measurement space with a light pattern.

Since the present embodiment has a single image acquiring section 1, distances are determined using a three-dimensional measurement method such as a light radar method wherein the distance information acquiring section 13 requires only a single image to be obtained.

The control section 8D treats the image obtained from the image acquiring section 1 as the sight image with the image acquiring section 1 as the reference camera. The position/camera property/image information is passed by the image acquiring section 1 through the control section 8D to the distance information acquiring section 13.

When the sight labeling device is activated, the control section 8D first sends the image acquiring section 1, position information acquiring section 2 and the camera descriptive information acquiring section 3 a process initiation command for obtaining information relating to the sight image. The position information acquiring section 1 receives the instruction from the control section 8D and gathers position information from the GPS receiver every second, and sends it to the control section 8D (step 21). In this case, the time interval is not necessarily restricted to units of seconds, and any interval may be taken. The camera descriptive information acquiring section 3 receives the instruction from the control section 8D and acquires the camera angle of the sight image recording device such as a camera while images are being taken as a group of a horizontal angle and an elevation angle (step 22), and simultaneously acquires the focal distance if the sight image recording device has a zoom capability (step 23). The image acquiring section 1 receives an instruction from the control section 8D and takes sight images every second, and sends them to the control section 8D (step 24). Since the image size is fixed for each sight image recording device, the control section 8D stores the image size information. The distance information acquiring section 13 determines the depth value, which is the distance from each point in the image with respect to the camera position while the images are being taken, at each point of each sub-domain (step 24-1). The control section 8D stores the gathered information in a sight image file as shown in FIG. 4. Subsequently, the procedures from steps 25–31 are performed in a manner similar to that of the second embodiment. After the step of dividing the CG image into sub-domains domains at step 31 is completed, the control section 8D instructs the label information preparation section 6D to perform a correlation between the sub-domains of the CG image and the sub-domains of the sight image.

Figure 19:
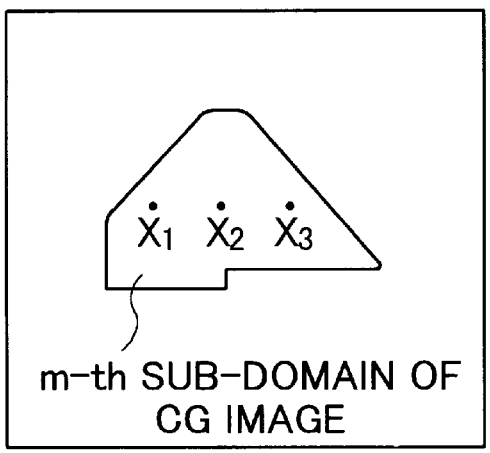
FIG. 19A is an example of a two-dimensional map.
FIG. 19B is an example of a three-dimensional map.
Figure 19:
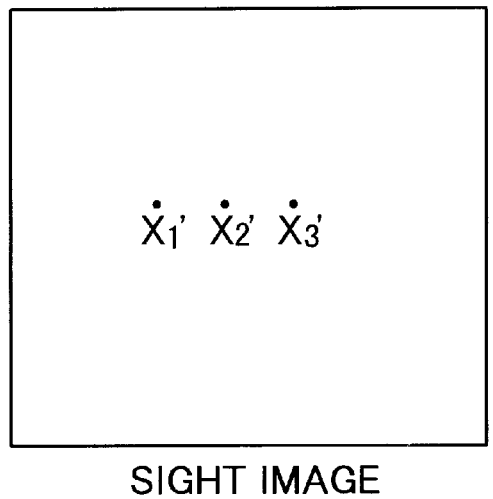

After the CG image is prepared at the label information preparation section 6D, the depth value which is the distance from each point in the sub-domains of the CG image with respect to the camera position while the images are being taken are determined. Next, the average depth value for each sub-domain of the CG image is determined based on the depth value at each point in the sub-domain of the CG image (step 31-2). For example, suppose the m-th sub-domain of a CG image is a sub-domain taken up by the image of a construction Z. At that time, it must be determined whether or not the construction Z actually exists in the sight image by comparing the distances (depth values) between the viewpoint and points in the image. Then, a plurality of sample coordinates $X_1$, $X_2$, $X_3$ are taken in the m-th sub-domain of the CG image, and the distances from the viewpoint (camera position) to the point $X_1$, the distance from the viewpoint to the point $X_2$, and the distance from the viewpoint to the point $X_3$ are calculated (see FIG. 19A). The points having coordinates in the sight image corresponding to the coordinates of the point $X_1$, $X_2$, $X_3$ are taken as the points $X_1'$, $X_2'$ and $X_3'$. The distance between the viewpoint and the point $X_1'$, the distance between the viewpoint and the point $X_2'$ and the distance between the viewpoint and the point $X_3'$ are each measured using the distance information acquiring section 13. If the distances between the viewpoint and the points $X_1$, $X_2$, $X_3$ are respectively 101 m, 103 m and 102 m, then the average depth value is 102 m. If the distances between the viewpoint and the points $X_1'$, $X_2'$ and $X_3'$ are respectively 99 m, 103 m and 101 m, then the average depth value is 101 m. In this case, the distance ratio is 0.99019. If the value is set to 0.90, then the construction Z is considered to exist in the sight image because 0.99019>0.90.

Next, the ratio (distance ratio) between the average depth value of each sub-domain of the CG image and the average depth value of each sub-domain of the sight image is determined. On the other hand, the ratio of overlap (overlap ratio) between the two sub-domains to be compared in the sight image and the CG image is determined. Then, the distance ratio and overlap ratio of the sub-domains to be compared are multiplied, and the results are compared with a preset threshold value. If greater than the threshold value, then they are correlated as being sub-domains relating to the same construction. This correlation is performed for the sub-domains in the sight image in order from the sub-domains with lower numbers (e.g., number 1) with respect to the sub-domains of the CG image (step 32D). The calculation of the overlap ratio is performed as follows. For example, with respect to a first sub-domain R1 of the sight image, the coordinate values of each pixel in the sub-domain are taken to be (A, B). The values of the pixels at the coordinates (A, B) are 1 due to being inside a sub-domain. In the first sub-domain S1 of the CG image, if the coordinates (A, B) are inside S1, then the pixel value will be 1 and they will overlap. If outside S1, the pixel value will be 0 and they will not overlap. In this way, the overlap coefficient K (A, B) at the coordinates (A, B) are determined to be 1 if they overlap and 0 if they do not overlap. The coordinates (A, B) are moved inside the sub-domain R1 to determine the overlap coefficients K (A, B). Then, with respect to the number N1 of coordinates (A, B) over which they are moved in the sub-domain R1, the number N2 of coordinates at which the overlap coefficient K (A, B) is 1 are determined, and the overlap ratio becomes N2/N1.

As alternative matching methods, it is possible to use evaluation functions such that they will have the same value even if there is a slight positional misalignment in the XY direction.

Thereafter, in the same manner as with the second embodiment, the label information preparation section 6D extracts the constructions of sub-domains in the CG image correlated with sub-domains in the sight image (step 33), then determines the information to be overlayed for each sub-domain of the sight image to prepare label information along with the positions at which they are to be overlayed (step 34). Then, upon receiving the prepared label information, the control section 8D orders the label information output section 7D to have the visual device output label information by display or the like. The names or descriptive information of constructions in the label information are overlayed at positions in the sight image (step 35), and the overlayed sight image is output to a video display device (step 37, see FIG. 12). Upon outputting the label information, the label information output section 7D notifies the control section of output completion. When the control section 8D receives the notification that the output has been completed, the procedural steps described above are once again performed if the sight labeling process is to be performed continuously.

Next, a modification of the fourth embodiment shall be explained with reference to FIG. 20 as a sight labeling device which is a fifth embodiment of the present invention. The sight labeling device of the fifth embodiment shown in FIG. 20 comprises first and second image acquiring sections 1A, 1B such as digital cameras for taking first and second images, first and second position information acquiring sections 2A, 2B such as GPS receivers for respectively recording the positions of the first and second image acquiring sections 1A, 1B while the images are being taken, first and second camera descriptive information acquiring sections 3A, 3B such as three-dimensional electronic compasses attached to the digital cameras for recording the camera angle, focal distance and image size while the first and second image acquiring sections 1, 2 are taking images, an image processing section 4 for dividing the taken images into a plurality of sub-domains, a distance information acquiring section 13B for determining the distance (depth value) from the second image to each point in the first image for each sub-domain of the first image, a map information processing section 5 for managing map information, determining a view space inside the map information space based on the recorded position (camera position), camera angle, focal distance and image size, and capturing the constructions present inside the view space, a label information preparation section 6D for correlating the constructions captured in the sub-domains of the image with ratios of the average depth values between the image and the CG image for each sub-domain by pattern matching, and preparing label information including the names or descriptive information of correlated constructions and the transfer positions, a label information output section 7D for overlaying the names or descriptive information of constructions in the prepared label information at the positions corresponding to the transfer positions in the image, and outputting the overlayed image to a visual device, and a control section 8E for controlling each section 1–7D described above.

Since the present embodiment has a plurality of image acquiring sections, position information acquiring sections and camera descriptive information acquiring sections, the distance information acquiring section 13B is capable of determining the camera position while images are being taken and each point in the sub-domains of the sight image not only be using the light radar method, but also by using the above-mentioned stereo image method, active stereo image method, and other methods which require a plurality of acquired images.

The control section 8E treats the first image acquiring section 1A as the reference camera and the images (first images) obtained from the first image acquiring section 1A as sight images. The second image acquiring section 1B is a camera which is installed for obtaining distance information, and the images (second images) from the second image acquiring section 1B which acquires the position, camera properties and images in the same manner as the first image acquiring section 1A are not treated as sight images. The position, camera property and image information from the first and second image acquiring sections 1A, 1B are sent through the control section 8E to the distance information acquiring section 13B.

When the sight labeling device is activated, the control section 8E first sends process initiation commands to the image acquiring sections 1A, 1B, the position information acquiring sections 2A, 2B and the camera descriptive information acquiring sections 3A, 3B in order to acquire information relating to the sight images. The position information acquiring sections 1A, 1B receive the instruction from the control section 8E, collect position information from a GPS receiver or the like every second, and sends these to the control section 8E. In this case, the time interval is not restricted to units of seconds, and may be any interval. The image acquiring sections 1A, 1B receive the instructions from the control section, take sight images every second, and send these to the control section 8E. The camera descriptive information acquiring sections 3A, 3B receive the instructions from the control section 8E, acquire the camera angle of the sight image recording device such as a camera while the images are being taken as groups of the horizontal angle and elevation angle, and simultaneously acquire the focal distances if the sight image devices have zoom capabilities. Since the image size is fixed for each sight image device, the control section 8E stores the image size information. The distance information acquiring section 13B determines the distances (depth values) from the second image to each point in the first image for each sub-domain. The control section 8E stores the collected information as a sight image file. The subsequent operations are the same as those of the fourth embodiment.

The sight labeling device of the present invention may also have three or more image acquiring sections, position information acquiring sections and camera descriptive information acquiring sections.

Figure 20:
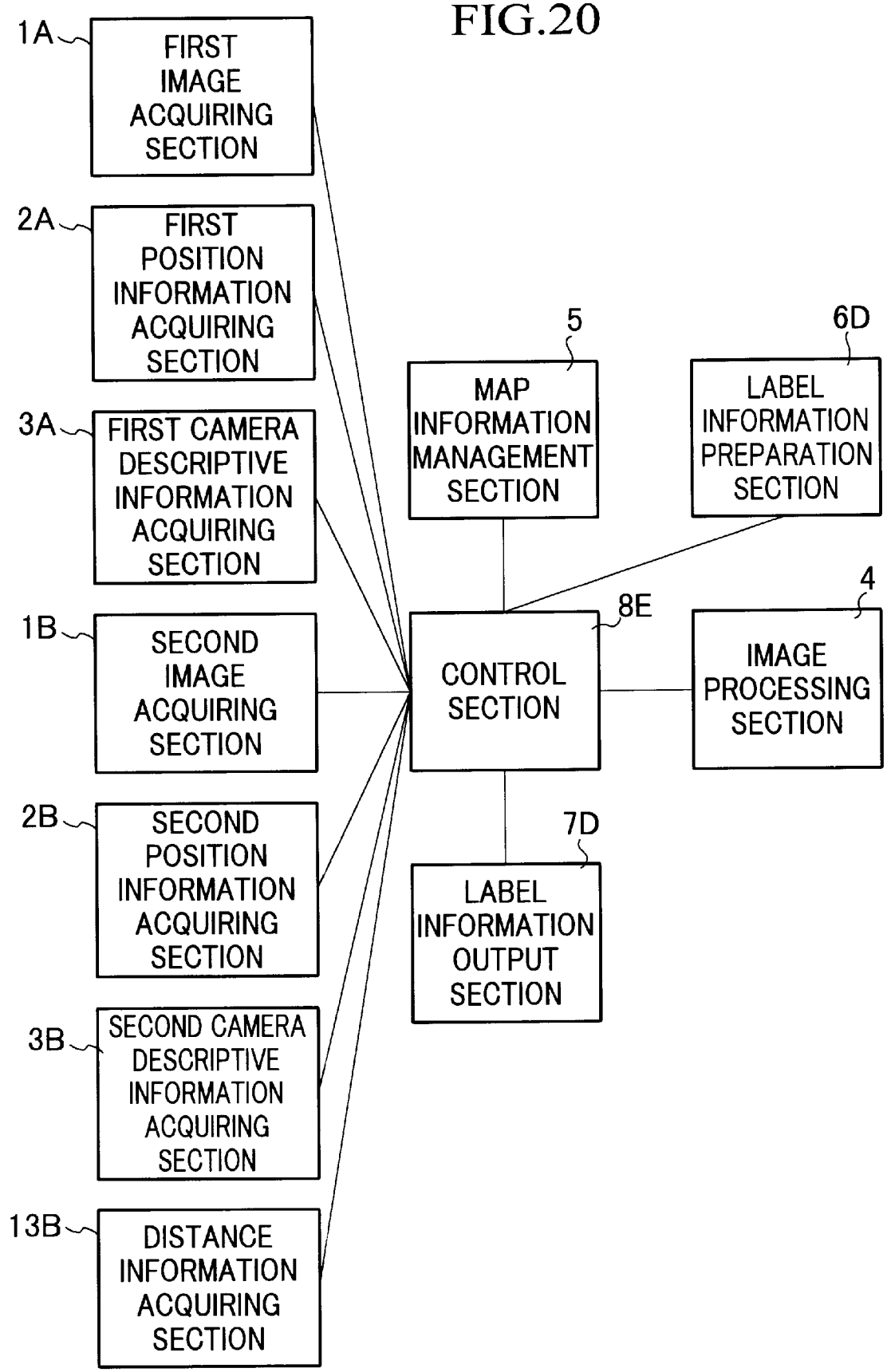
FIG. 20 is a diagram showing the structure of a distance-reference sight labeling device of a fifth embodiment of the present invention.
Figure 21:
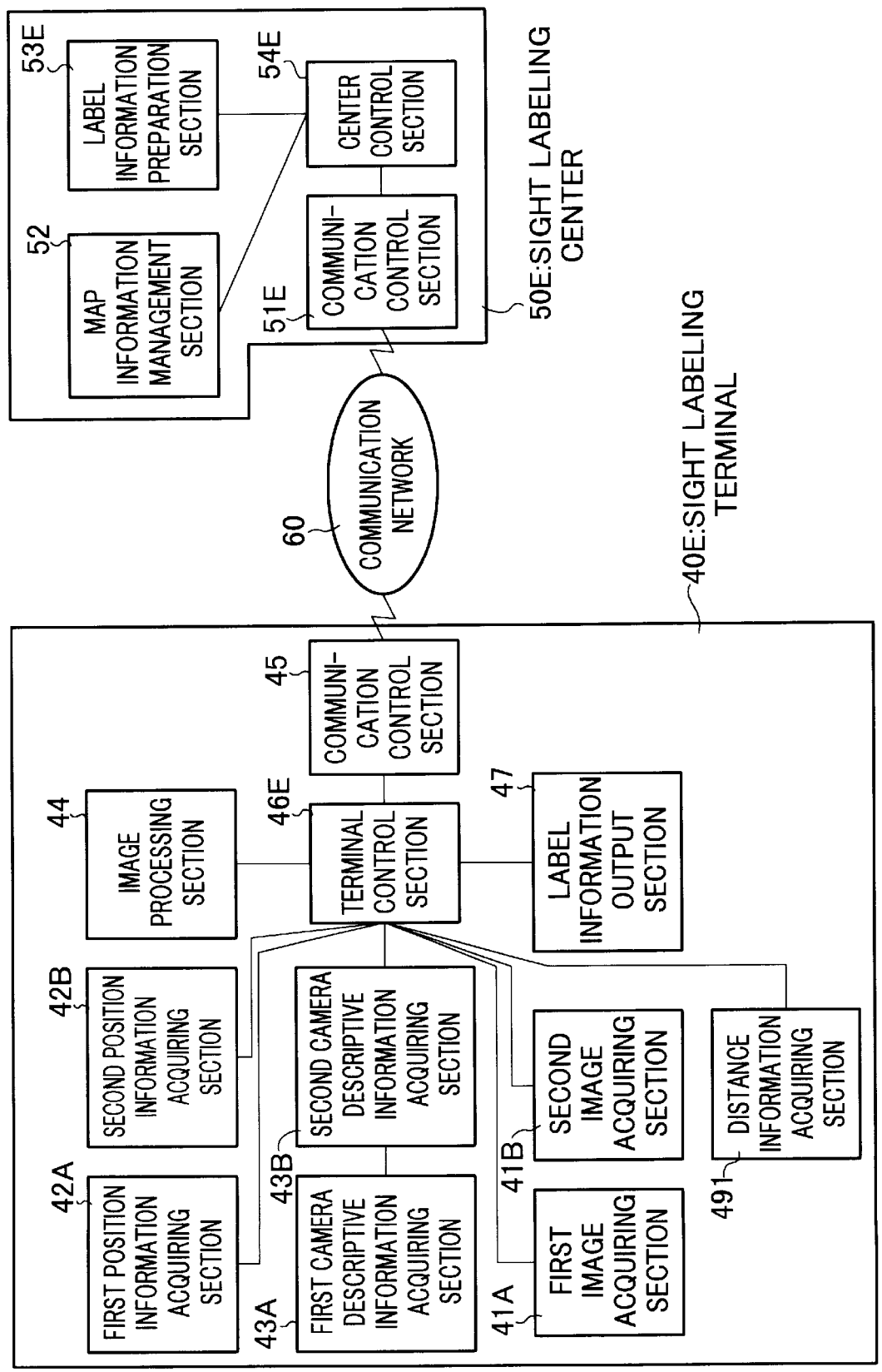
FIG. 21 is a diagram showing the structure of a sight labeling system of the present embodiment.

FIG. 21 is a diagram showing the structure of a sight labeling system wherein the sight labeling device of FIG. 20 is applied to a communication system. The sight labeling system comprises a sight labeling terminal 40E, a sight labeling center 50 and a communication network 60. In FIG. 21, the elements which are identical to those in Fig. 13 are denoted by the same reference numbers.

The sight labeling terminal 40E comprises first and second image acquiring section 41A, 41B for taking images, first and second position information acquiring sections 42A, 42B for recording the camera position while images are being taken, first and second camera descriptive information acquiring sections 43A, 43B for recording the camera angle, focal distance and image size while the images are being taken, an image processing section 44 for dividing the taken images into a plurality of sub-domains, a distance information acquiring section 491 for determining the depth value at each point for each sub-domain in the images, which is the distance to each point in the image from the camera position while images are being taken, a communication control section 45 for sending information relating to the division of the images into sub-domains, the camera position, camera angle, focal distance and image size through the communication network 60 to the sight labeling center 50, and receiving label information from the sight labeling center 50, a label information output section 47 for overlaying the names or descriptive information of constructions in the label information at positions corresponding to the transfer positions in the images, and outputting the overlayed images to a visual device, and a terminal control section 46E for controlling each of the sections described above.

The sight labeling center 50E comprises a communication control section 51E for receiving the information relating to the division of the images into sub-domains, the camera position, camera angle, focal distance, image size and average depth value through the communication network 60 from the sight labeling terminal 40E, and sending the label information to the sight labeling terminal 40E, a map information management section 52 for managing the map data, determining the view space inside the map information space based on the received camera position, camera angle, focal distance and image size, and capturing the constructions present inside the view space, a label information preparation section 53E for preparing a CG image which is a computer graphics image based on the constructions captured by the map information management section 52, then determining the depth value which is the distance from the camera position while the images are being taken to each point for each sub-domain of the CG image, correlating the sub-domains of the image with the sub-domains of the CG image by comparing the groups of depth values at the points in each sub-domain of the CG image with groups of depth values at the points in each sub-domain of the image, determining the constructions in the correlated sub-domains, and preparing label information including the names and descriptive information of the constructions and transfer positions, and a center control section 54E for controlling each of the sections described above.

The operations of the present system are the same as the operations of the device shown in FIG. 20. Additionally, the number of image acquiring sections, position information acquiring sections and camera descriptive information acquiring sections may be one each as with the fourth embodiment shown in FIG. 17, or there may be three or more.

What is claimed is:

1. A system for sight labeling comprising a sight labeling terminal and a sight labeling center;

said sight labeling terminal comprising image acquiring means for taking images, position information acquiring means for acquiring a camera position while the images are being taken, camera descriptive information acquiring means for acquiring a camera angle, a focal distance and an image size while the images are being taken, image processing means for dividing the taken images into a plurality of sub-domains, communication control means for sending information relating to division of said images into sub-domains, the camera angle, the focal distance and the image size through the communication network to said sight labeling center, and receiving label information from said sight labeling center, labeling information output means for overlaying names or descriptive information of constructions in said label information at predetermined positions in said image corresponding to said transfer positions inside said label information, positions in the images, and outputting the overlayed images to a visual device, and terminal control means for controlling the means described above; and said sight labeling center comprising communication control means for receiving information relating to division of said images into sub-domains, the camera angle, the focal distance and the image size through the communication network from said sight labeling terminal, and sending said label information to said sight labeling terminal, map information management means for managing map information containing constructions, determining a view of a camera based on the received position, camera angle, focal distance and image size, and calculating a view space formed by said view within a space of said map information and thereby capturing constructions present inside the view space, label information preparation means for correlating the captured constructions with respect to said sub-domains of said images, specifying transfer positions of said captured constructions in said image, and preparing said label information including the transfer positions and the names or descriptive information of the correlated constructions, and center control means for controlling the means described above.

2. A system for sight labeling in accordance with claim 1, wherein said label information preparation means prepares CG images which are computer graphics images based on the captured constructions, correlates said sub-domains in said images with sub-domains in said CG images by pattern matching, determines the constructions of the correlated sub-domains, and prepares label information including the names or descriptive information of the constructions and their transfer positions.

3. A system for sight labeling in accordance with claim 1, wherein said label information preparation means three-dimensional projection transforms the captured constructions onto the camera screen, prepares CG images by eliminating constructions which are not capable of being seen from the viewpoint, divides the CG images into sub-domains along profile lines of the sub-domains in the CG images, correlates said sub-domains in said images with sub-domains in said CG images by pattern matching, determines the constructions which are the basis of the sub-domains in the CG image correlated with the sub-domains of the images, and prepares label information including the names or descriptive information of the constructions and their transfer positions.

4. A system for sight labeling in accordance with claim 1, wherein
- said sight labeling terminal further comprises distance information acquiring means for determining for each point in said images a depth value which is the distance to the points in said images from the camera position while the images are being taken by said image acquiring means;
- in said sight labeling terminal, said label information output means sends information relating to division of said images into sub-domains, the camera angle, the focal distance, the image size and depth values through the communication network to said sight labeling center, and receives label information from said sight labeling center; and
- in said sight labeling center, said communication control means receives information relating to division of said images into sub-domains, the camera angle, the focal distance, the image size and depth values through the communication network from said sight labeling terminal, and sends said label information to said sight labeling terminal, and
- said label information preparation means, after preparing CG images which are computer graphics images based on constructions captured by said map information management means, determines depth values which are the distances to each point in the sub-domains of the CG images from said camera position while said images are being taken, correlates the sub-domains of said images with the sub-domains of said CG images by comparing groups of depth values for the points in each sub-domain of said CG images and groups of depth values for the points in each sub-domain of said images, determines the constructions of the correlated sub-domains, and prepares label information including the names or descriptive information of said constructions and their transfer positions.

5. A system for sight labeling in accordance with claim 4, wherein in said sight labeling center, said label information preparation means, after preparing CG images which are computer graphics images based on constructions captured by said map information management means, determines depth values which are the distances to each point in the sub-domains of the CG images from said camera position while said images are being taken, correlates the sub-domains of said images with the sub-domains of said CG images by pattern-matching using the ratios between groups of depth values for the points in each sub-domain of said CG images and groups of depth values for the points in each sub-domain of said images and overlap ratios between the sub-domains of said CG images and the sub-domains of said images, determines the constructions of the correlated sub-domains, and prepares label information including the names or descriptive information of said constructions and their transfer positions.

6. A device for sight labeling in accordance with either claim 4, wherein said label information preparation means three-dimensional projection transforms the captured constructions onto the camera screen, prepares CG images by eliminating constructions which are not capable of being viewed from the viewpoint, and divides the CG images into sub-domains by the profile lines of sub-domains in the CG images.

7. A device for sight labeling in accordance with either claim 4, comprising a plurality of each of said image acquiring means, said position information acquiring means and said camera descriptive information means.

8. A device for sight labeling comprising:
- image acquiring means for taking images;
- position information acquiring means for acquiring a camera position while the images are being taken;
- camera descriptive information acquiring means for acquiring a camera angle, a focal distance and an image size while the images arc being taken;
- image processing means for dividing images acquired by said image acquiring means into a plurality of sub-domains;
- map information management means for managing map information containing constructions, determining a view of camera based on the received position, camera angle, focal distance and image size, and calculating a view space formed by said view within a space of said map information, and capturing constructions present inside the view space;
- label information preparation means for correlating the captured constructions with respect to sub-domains of said images, specifying transfer positions of said captured constructions in said image, and preparing label information including the names of descriptive information of the correlated constructions and their transfer positions;
- communication address memory means for storing communication addresses of communication devices relating to said constructions;
- communication processing means for setting up communication paths with said communication addresses based on the received communication addresses;
- labeling information output means for overlaying the names or descriptive information of constructions in said label information at predetermined positions within the images corresponding to the transfer positions inside the prepared label information, and outputting the overlayed images to a visual device;
- screen position indicating means for allowing a user to indicate a position on the screen of the visual device, determining the construction in said label information corresponding to the indicated screen position when a position on the screen of said visual device is indicated by said user, determining the communication address of the communication device relating to the determined construction from said communication address memory means; and
- control means for controlling the means described above.

9. A sight labeling device in accordance with claim 8, wherein said communication processing means is constructed such that when said user indicates a position on the screen of the visual device, the received communication address information is temporarily displayed on said visual device, and the communication path with said communication address is set up in response to a communication initiation request by said user.

10. A device for sight labeling in accordance with claim 8, further comprising:
   image processing means for dividing images acquired by said image acquiring means into a plurality of sub-domains; wherein
   said label information preparation means correlates the captured constructions with respect to sub-domains of said images, and prepares label information including the names or descriptive information of the correlated constructions and their transfer positions;
   said label information output means overlays the names or descriptive information in said label information at positions corresponding to their transfer positions in the images, displays the overlayed images on the visual device, and displays a communication address on the visual device upon receiving a communication address; and
   said control means controls each means including said image acquiring means.

11. A device for sight labeling in accordance with any one of claim 8, further comprising:
   target condition designating means for enabling a user to designate target conditions; wherein
   said label information preparation means appends target condition identifying information indicating that the target conditions designated by the user have been fulfilled to said label information; and
   said label information output means displays that a construction matches the target conditions when target condition identifying information is appended to said label information.

12. A device for sight labeling in accordance with any one of claim 8, wherein said label information preparation means prepares CG images which are computer graphics images based on the captured constructions, correlates said sub-domains in said images with sub-domains in said CG images by pattern matching, determines the constructions of the correlated sub-domains, and prepares label information including the names or descriptive information of the constructions and their transfer positions.

13. A device for sight labeling in accordance with any one of claim 8, wherein said label information preparation means three-dimensional projection transforms the captured constructions onto the camera screen, prepares CG images by eliminating constructions which are not capable of being seen from the viewpoint, divides the CG images into sub-domains along profile lines of the sub-domains in the CG images, correlates said sub-domains in said images with sub-domains in said CG images by pattern matching, determines the constructions which are the basis of the sub-domains in the CG image correlated with the sub-domains of the images, and prepares label information including the names or descriptive information of the constructions and their transfer positions.

14. A system for sight labeling comprising a sight labeling terminal and a sight labeling center;
   said sight labeling terminal comprising
      image acquiring means for taking images,
      position information acquiring means for acquiring a camera position while the images are being taken,
      camera descriptive information acquiring means for acquiring a camera angle, a focal distance and an image size while the images are being taken,
      image processing means for dividing the taken images into a plurality of sub-domains,
      communication control means for sending information relating to division of said images into sub-domains, the camera angle, the focal distance and the image size through the communication network to said sight labeling center, and
      receiving label information and communication addresses from said sight labeling center,
      communication processing means for setting up paths to said communication addresses based on the received communication addresses,
      labeling information output means for overlaying names or descriptive information of constructions in said label information at a predetermined position of said image corresponding to said transfer positions inside said label information and displaying the overlayed images on a visual device,
      screen position indicating means for allowing a user to indicate a position on the screen of the visual device, determining the construction in said label information corresponding to the indicated screen position when a position on the screen of said visual device is indicated by said user, outputting said construction to said communication control means, and sending the communication address of the communication device relating to said construction received by said communication control means to said communication processing means;
      said terminal control means for controlling the means described above; and said sight labeling center comprising
         communication control means for receiving information relating to division of said images into sub-domains, the camera angle, the focal distance and the image size through the communication network from said sight labeling terminal, and sending said label information and communication address to said sight labeling terminal,
         map information management means for managing map information containing constructions, determining a view of a camera based on the received position, camera angle, focal distance and image size, calculating a view space formed by said view in a space of said map information, and thereby capturing constructions present inside the view space,
         label information preparation means for correlating the captured constructions with respect to said sub-domains of said images, specifying transfer positions of said acquired constructions in said image, and preparing label information including the names or descriptive information of the correlated constructions and their transfer positions,
         communication address memory means for storing communication addresses of communication devices relating to said constructions, and outputting communication addresses of constructions indicated by information of constructions in said label information, and
         center control means for controlling the means described above.

15. A system for sight labeling in accordance with claim 14, wherein said communication processing means is constructed such that when said user indicates a position on the screen of the visual device, the received communication address information is temporarily displayed on said visual device, and the communication path with said communication address is set up in response to a communication initiation request by said user.

16. A system for sight labeling in accordance with any one of claim 14, said sight labeling terminal further comprising:
target condition designating means for enabling a user to designate target conditions; wherein
said label information preparation means appends target condition identifying information indicating that the target conditions designated by the user have been fulfilled to said label information; and
said label information output means displays that a construction matches the target conditions when target condition identifying information is appended to said label information.

17. A system for sight labeling in accordance with any one of claim 14, wherein said label information preparation means prepares CG images which are computer graphics images based on the captured constructions, correlates said sub-domains in said images with sub-domains in said CG images by pattern matching, determines the constructions of the correlated sub-domains, and prepares label information including the names or descriptive information of the constructions and their transfer positions.

18. A system for sight labeling in accordance with any one of claim 14, wherein said label information preparation means three-dimensional projection transforms the captured constructions onto the camera screen, prepares CG images by eliminating constructions which are not capable of being seen from the viewpoint, divides the CG images into sub-domains along profile lines of the sub-domains in the CG images, correlates said sub-domains in said images with sub-domains in said CG images by pattern matching, determines the constructions which are the basis of the sub-domains in the CG image correlated with the sub-domains of the images, and prepares label information including the names or descriptive information of the constructions and their transfer positions.

19. A system for sight labeling comprising a sight labeling terminal and a sight labeling center;
said sight labeling terminal comprising
image acquiring means for taking images,
position information acquiring means for acquiring a camera position while the images are being taken,
camera descriptive information acquiring means for acquiring a camera angle, a focal distance and an image size while the images are being taken,
image processing means for dividing the taken images into a plurality of sub-domains,
communication control means for sending information relating to division of said images into sub-domains, the camera angle, the focal distance and the image size through the communication network to said sight labeling center, and receiving label information and communication addresses from said sight labeling center,
labeling information output means for overlaying names or descriptive information of constructions in said label information at predetermined position within said image corresponding to said transfer positions inside said label information at corresponding positions in the images, and displaying the overlayed images on a visual device, and for displaying a communication address on said visual device when said communication address is received,
screen position indicating means for allowing a user to indicate a position on the screen of the visual device, determining the construction in said label information corresponding to the indicated screen position when a position on the screen of said visual device is indicated by said user, outputting said construction to said communication control means, and sending the communication address of the communication device relating to said construction received by said communication control means to said label information output means; and
terminal control means for controlling the means described above; and said sight labeling center comprising
communication control means for receiving information relating to division of said images into sub-domains, the camera angle, the focal distance and the image size through the communication network from said sight labeling terminal, and sending said label information and communication address to said sight labeling terminal,
map information management means for managing map information containing constructions, determining a view of a camera based on the received position, camera angle, focal distance and image size, calculating a view space formed by said view in a space of said map information, and thereby capturing constructions present inside the view space,
label information preparation means for correlating the captured constructions with respect to said sub-domains of said images, specifying a transfer position of said acquired constructions in said image, and preparing label information including the names or descriptive information of the correlated constructions and their transfer positions,
communication memory means for storing communication addresses of communication devices relating to said constructions, and outputting communication addresses of constructions indicated by information of constructions in said label information, and center control means for controlling the means described above.

* * * * *